(12) United States Patent
Jorguseski et al.

(10) Patent No.: US 9,936,445 B2
(45) Date of Patent: Apr. 3, 2018

(54) SESSION SETUP IN AN ENERGY-EFFICIENT CELLULAR WIRELESS TELECOMMUNICATIONS SYSTEM

(71) Applicants: Koninklijke KPN N.V., The Hague (NL); NEDERLANDSE ORGANISATIE VOOR TOEGEPAST-NATUURWETENSCHAPPELIJK ONDERZOEK TNO, The Hague (NL)

(72) Inventors: Ljupco Jorguseski, Rijswijk (NL); Adrian Victor Pais, Voorburg (NL); Haibin Zhang, The Hague (NL); Job Cornelis Oostveen, Haren (NL); Jacob Cornelis Van Der Wal, Vaassen (NL)

(73) Assignees: KONINKLIJKE KPN N.V., The Hague (NL); NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 14/971,978

(22) Filed: Dec. 16, 2015

(65) Prior Publication Data

US 2016/0192279 A1 Jun. 30, 2016

Related U.S. Application Data

(63) Continuation of application No. 14/344,292, filed as application No. PCT/EP2012/067864 on Sep. 12, 2012, now Pat. No. 9,307,485.

(30) Foreign Application Priority Data

Sep. 13, 2011 (EP) ..................................... 11181162

(51) Int. Cl.
*H04W 4/00* (2009.01)
*H04W 48/16* (2009.01)
(Continued)

(52) U.S. Cl.
CPC ........... *H04W 48/16* (2013.01); *H04W 48/20* (2013.01); *H04W 52/0206* (2013.01);
(Continued)

(58) Field of Classification Search
CPC ......................... H04W 16/32; H04W 52/0206
See application file for complete search history.

(56) References Cited

U.S. PATENT DOCUMENTS 5,390,339 A 2/1995 Bruckert et al.
9,307,485 B2 4/2016 Jorguseski et al.
(Continued)

FOREIGN PATENT DOCUMENTS

CN 1863382 11/2006
EP 1 708 439 10/2006
(Continued)

OTHER PUBLICATIONS

Notification of Transmittal of the International Search Report and the Written Opinion of the International Searching Authority for PCT/EP2012/071961, "Distribution of System Information in a Wireless Access Telecommunications System", dated Mar. 5, 2013.
(Continued)

*Primary Examiner* — Thomas Lett
(74) *Attorney, Agent, or Firm* — Hamilton, Brook, Smith & Reynolds, P.C.

(57) ABSTRACT

The invention relates to a telecommunications system comprising at least a plurality of SA-cells. The invention provides a method for a terminal to facilitate establishment of a data connection between the terminal and at least one of the SA-cells. The method includes steps of, while the
(Continued)

terminal is in an idle mode, the terminal transmitting an information request message (IRM) for the plurality of SA-cells and receiving, from each SA-cell of one or more SA-cells of the plurality of SA-cells, a message comprising at least information indicative of a strength with which the each SA-cell received the IRM. The method further includes the step of, at least partially based on the messages received from the one or more SA-cells, the terminal selecting an SA-cell of the plurality of SA-cells for establishing the data connection between the terminal and the selected SA-cell.

14 Claims, 7 Drawing Sheets

(51) Int. Cl.
  *H04W 48/20* (2009.01)
  *H04W 52/02* (2009.01)
  H04W 84/04 (2009.01)
  H04W 24/10 (2009.01)
  H04W 76/02 (2009.01)
(52) U.S. Cl.
  CPC ............ *H04W 24/10* (2013.01); *H04W 76/02* (2013.01); *H04W 84/045* (2013.01); *Y02B 60/50* (2013.01)

(56) References Cited

U.S. PATENT DOCUMENTS

| | | | |
|---|---|---|---|
| 2003/0013452 A1 | 1/2003 | Hunt et al. | |
| 2004/0165563 A1 | 8/2004 | Hsu | |
| 2004/0218605 A1 | 11/2004 | Gustafsson | |
| 2005/0002373 A1 | 1/2005 | Watanabe et al. | |
| 2006/0089964 A1 | 4/2006 | Pandey et al. | |
| 2007/0133492 A1 | 6/2007 | Baek et al. | |
| 2007/0297373 A1 | 12/2007 | Saifullah | |
| 2008/0261570 A1 | 10/2008 | Barker et al. | |
| 2009/0061767 A1 | 3/2009 | Horiuchi et al. | |
| 2009/0197631 A1 | 8/2009 | Palanki et al. | |
| 2009/0239533 A1 | 9/2009 | Somasundaram et al. | |
| 2009/0286563 A1 | 11/2009 | Ji et al. | |
| 2010/0027510 A1 | 2/2010 | Balasubramanian et al. | |
| 2010/0027525 A1 | 2/2010 | Zhu | |
| 2010/0075694 A1 | 3/2010 | Damnjanovic | |
| 2010/0111062 A1 | 5/2010 | Cho et al. | |
| 2010/0130212 A1 | 5/2010 | So et al. | |
| 2010/0240365 A1 | 9/2010 | Chen | |
| 2010/0260052 A1 | 10/2010 | Cho et al. | |
| 2010/0279689 A1 | 11/2010 | Tinnakomsrisuphap et al. | |
| 2010/0323663 A1 | 12/2010 | Vikberg | |
| 2011/0053617 A1 | 3/2011 | Lee et al. | |
| 2011/0090831 A1 | 4/2011 | Howard | |
| 2011/0105116 A1 | 5/2011 | Kim | |
| 2011/0117889 A1 | 5/2011 | Burgess | |
| 2011/0143755 A1 | 6/2011 | Khaledul et al. | |
| 2011/0151886 A1 | 6/2011 | Grayson et al. | |
| 2011/0223915 A1 | 9/2011 | Kwack et al. | |
| 2011/0225440 A1 | 9/2011 | Kwon | |
| 2011/0237239 A1* | 9/2011 | Chou ................... | H04W 48/08 455/422.1 |
| 2011/0294493 A1 | 12/2011 | Nagaraja | |
| 2012/0009936 A1 | 1/2012 | Ishii et al. | |
| 2012/0028637 A1 | 2/2012 | Kashikar | |
| 2012/0058771 A1 | 3/2012 | Yu | |
| 2012/0077517 A1 | 3/2012 | Suzuki | |
| 2012/0100884 A1 | 4/2012 | Radulescu | |
| 2012/0201164 A1* | 8/2012 | Jongren ................ | H04L 5/0048 370/252 |
| 2012/0225638 A1 | 9/2012 | Barnes | |
| 2012/0258757 A1 | 10/2012 | Qiu | |
| 2013/0039195 A1 | 2/2013 | Weng et al. | |
| 2013/0267234 A1 | 10/2013 | Choi | |
| 2014/0050129 A1 | 2/2014 | Magadi Rangaiah | |
| 2014/0177492 A1 | 6/2014 | Sun | |
| 2014/0179324 A1 | 6/2014 | Lee et al. | |
| 2014/0293950 A1* | 10/2014 | Benjebbour .......... | H04W 16/32 370/329 |
| 2014/0315549 A1 | 10/2014 | Zhang et al. | |
| 2014/0335882 A1 | 11/2014 | Lee et al. | |
| 2014/0364116 A1 | 12/2014 | Jorguseski et al. | |
| 2015/0151886 A1 | 6/2015 | Kim | |
| 2015/0230236 A1 | 8/2015 | Zeng | |
| 2016/0165522 A1 | 6/2016 | Zhang et al. | |

FOREIGN PATENT DOCUMENTS

| | | |
|---|---|---|
| EP | 1 796 409 A2 | 6/2007 |
| EP | 1 887 822 | 2/2008 |
| EP | 2 056 609 A1 | 5/2009 |
| EP | 2 211 506 | 7/2010 |
| EP | 2 282 583 | 2/2011 |
| JP | 2001-160813 A | 6/2001 |
| JP | 2005-269109 | 9/2005 |
| JP | 2007-74304 | 3/2007 |
| JP | 2007-266876 | 10/2007 |
| JP | 2010-166475 | 7/2010 |
| JP | 2011-091748 | 5/2011 |
| JP | 2011-101361 | 5/2011 |
| JP | 2011-176588 | 9/2011 |
| WO | WO 2004/091246 A1 | 10/2004 |
| WO | WO 2006/106692 A1 | 10/2006 |
| WO | WO 2008/023609 | 2/2008 |
| WO | WO 2009/022533 | 2/2009 |
| WO | WO 2009/022951 A1 | 2/2009 |
| WO | WO 2009/082076 | 7/2009 |
| WO | WO 2010/078210 A1 | 7/2010 |
| WO | WO 2010/078271 A2 | 7/2010 |
| WO | WO 2010/084282 A1 | 7/2010 |
| WO | WO 2010/117235 A2 | 10/2010 |
| WO | WO 2013/037842 | 3/2013 |
| WO | WO 2013/037875 | 3/2013 |
| WO | WO 2013/068362 A1 | 5/2013 |
| WO | WO 2013/068368 A1 | 5/2013 |
| WO | WO 2013/068369 A1 | 5/2013 |

OTHER PUBLICATIONS

Extended European Search Report for EP 11188289.0, "Distribution of System Information in a Wireless Access Telecommunications System", dated Jul. 5, 2012.
Notification of Transmittal of the International Search Report and the Written Opinion of the International Searching Authority, PCT/EP2012/067864, dated Oct. 30, 2012.
"LTE; Evolved Universal Terrestrial Radio Access (E-UTRA); Physical Layer Procedures (3GPP TS 36.213, Version 10.2.0 Release 10)", Technical Specification, European Telleecommunications Standards Institute (ETSI), vol. 3GPP RAN 1, No. V10.2.0, chapters 7.1, 8.2, Jun. 1, 2011.
"Node B Measurements for LTE", Nokia Siemens Networks, 3GPP Draft; R1-073682 ENB Meas, $3^{rd}$ Generation Partnership Project (3GPP), vol. RAN WG1, Athens, Greece; Chapters 2.2, 2.3, Aug. 16, 2007.
"LTE; Evolved Universal Terrestrial Radio Access (E-UTRA); Potential Solutions for Energy Saving for E-UTRAN (3GPP TR 36.927 version 10.0.0 Release 10)", Technical Report, European Telecommunications Standards Institute (ETSI), vol. 3GPP RAN 3, No. V10.0.0, chapters 5.1, 6.1, Jul. 1, 2011.
"LTE; Evolved Universal Terrestrial Radio Access (E-UTRA); User Equipment (UE) Procedures in Idle Mode (3GPP TS 36.304 version 10.2.0 Release 10)", Technical Specification, European Telecommunications Standards Institute (ETSI), vol. 3GPP RAN 2, No. V10.2.0, chapter 3.1, 4.15.2, 7, Jun. 1, 2011.
Ashraf, Imran, et al., "Improving Energy Efficiency of Femtocell Base Stations via User Activity Detection", Wireless Communications and Networking Confe3rence (WCNC), 2010 IEEE, pp. 1-5, Apr. 18, 2010.

(56) References Cited

OTHER PUBLICATIONS

Mahmud, K., et al., "Mobility Management by Basic Access Network in MIRAI Architecture for Heterogeneous Wireless Systems", Globecom '02, 2002—IEEE Global Telecommunications Conference, Nov. 17-21, 2002, vol. 2, Nov. 17, 2002.
Masakatsu, Ogawa, et al., "Power Saving Control Method for Battery-Powered Portable Wireless LAN Access Points in an Overlapping BSS Environment," IEICE Transactions on Communications, Communications Society, vol. E94B, No. 3, pp. 658-666, Mar. 1, 2011.
Notice of Allowance dated Jan. 5, 2016 for U.S. Appl. No. 14/344,292.

\* cited by examiner

SESSION SETUP IN AN ENERGY-EFFICIENT CELLULAR WIRELESS TELECOMMUNICATIONS SYSTEM

RELATED APPLICATIONS

This application is a continuation of U.S. application Ser. No. 14/344,292, filed Sep. 12, 2012, which is the U.S. National Stage Application of International Application No. PCT/EP2012/067864 filed on Sep. 12, 2012, published in English, which claims priority under 35 U.S.C. § 119 or 365 to European Application No. 11181162.6, filed Sep. 13, 2011.

FIELD OF THE INVENTION

Generally, the invention relates to the field of wireless telecommunications. More specifically, the invention relates to the field of establishing a data connection between a terminal and a cell in an energy-efficient cellular wireless network.

BACKGROUND OF THE INVENTION

A cellular wireless access telecommunications network (system) typically includes multiple base stations, also known as, for example, base terminal station in GSM, NodeB in WCDMA (UMTS), and evolved NodeB or eNB in LTE. A base station includes at least transmitting and receiving equipment to support wireless communication with a (possibly mobile) terminal, in standardization more formally known as UE (User Equipment). The range that can be covered with the transmitter/receiver in a base station is limited. The area that can be served by the transmitter/receiver of a base station is referred to as its "coverage area" or as the "cell." As used herein, the term "cell" refers to both the base station itself and to its associated coverage area.

A cell (base station) in a cellular network is typically connected to the remainder of the network via one or more backhaul links, for example, via optical fiber, via copper wire or wirelessly. A base station further includes processing capabilities, for example for the wireless transmission and reception and for handling the protocols specified between the base station and the terminal and between the base station and the network, including other cells.

In a cellular network, different cells may have different sizes, indicated e.g. as macrocells, microcells, picocells or femtocells in decreasing order of cell size. Cells may show a partial overlap with nearby cells or a smaller cell (e.g. picocell) may be entirely overlapped by a larger cell (e.g. macrocell). Multiple cells may thus form a cellular network providing near contiguous coverage in a very large area.

In a cellular network it is common that each cell (base station), when in operation, transmits broadcast signals. Such signals are known as, for example, BCH (Broadcast CHannel) in GSM, as CPICH (Common Pilot CHannel) in WCDMA (UMTS) and as RSs (Reference Signals) in LTE. The same or separate broadcast signals are used to indicate a cell's (base station's) presence and to broadcast information about the cell (system information), for example, the cell identity and information about the configuration of the cell and/or about the cell's resources, such as e.g. which channel to use in order to initiate contact with the cell. Such broadcast signals allow terminals to make measurements on the broadcast signals, e.g. to determine the strength of the signal received by the terminal, and to receive the cell's system information. The broadcast signals are usually transmitted as long as the cell is in operation. The transmit power involved in broadcasting these signals may consume up to 20% of the cell's maximum transmit power, also when the cell does not actually exchange data with a terminal in the cell or when there is no terminal at all in the cell.

In a cellular wireless network it is common to distinguish a terminal to be in an 'idle mode' or in an 'active mode'. In the active mode, the terminal is able to exchange data (e.g. sending/receiving an e mail or making a phone call) via a cell in which the terminal is located. This requires resources in the network (e.g. frequencies and/or codes) and also requires the terminal and the network to provide power for the purpose. In the idle mode the terminal is not able to exchange data and, therefore, does not require the above resources and consumes less power. A terminal in the idle mode only regularly listens to signals broadcast by the cells and selects a 'best cell', for example the cell with the signal that the terminal receives as strongest. A terminal in the idle mode also monitors the paging channel transmitted by the selected cell for a paging message addressing the terminal. Such an (idle mode) terminal is said to 'camp on' the selected cell. When, for example because of terminal mobility, a different cell is identified as best cell, the terminal may re-select the different cell as 'best cell' and camp on the newly selected cell. It should be noted that a terminal in the idle mode normally does not inform the cell and/or the network about which cell the terminal is camping on, also not when re-selecting a different cell as best cell. When the terminal re-selects to a cell which is found to be in a different location area (LA or RA—routing area), which the terminal may determine from the cell's system information, then the terminal initiates contact with the network via the newly selected cell to perform an LA or RA update procedure, and subsequently returns to the idle mode. Thus, the network is made aware of the LA/RA the idle terminal is located in. A LA/RA commonly comprises multiple cells, as configured by the network operator. Consequently, the network is not aware on which cell an idle mode terminal is camping on, it is only aware in which LA/RA an idle terminal is (expected to be) located.

In a cellular wireless access telecommunications network a terminal and the network need to set up a session when the terminal requests a service or is being paged. This involves a terminal in the idle mode making a transition to the active mode. In an LTE network, for example, a session setup is a two-step process, the result of which is illustrated in FIG. 1. If service is initiated by the network, the network performs a paging procedure, where a paging message is broadcast in all cells where the network expects the terminal to be camping on (RA/LA). When the terminal receives a paging message addressing the terminal, or if service is initiated by the terminal without having been paged, in a first step the terminal performs a random access channel (RACH) procedure towards the cell it currently is camping on to establish a Radio Resource Control (RRC) connection. When successful, in the second step, the RRC connection with that cell is used to negotiate resources for and to establish a data connection between the terminal and that cell. Then the wireless exchange of user data between the terminal and the cell is possible. 3GPP TS 36.213 and 3GPP TS 36.331 describe these procedures in more detail.

As is illustrated in FIG. 1, for the LTE network as well as for other legacy networks such as e.g. GSM and UMTS, all transmissions, be it signalling or data, occur between the terminal and a single cell which is the same cell that the terminal was camping on when it was in idle mode.

Recently, a new, more energy efficient, network architecture is being developed. One aspect in the new architecture is the use of relatively small cells. High bit rate data connections can be much more efficiently provided with a larger number of (at least partially overlapping) small cells (e.g. microcells, picocells, femtocells) than with a fewer number of larger cells (e.g. macrocells). A further aspect in the new architecture is that the power consumption of a cell is envisioned to scale, as much as possible, with the service actually provided (e.g. with the number of active terminals served, with the bit rate provided to a terminal, with the distance covered by the connection to a terminal, etc.). One approach for realizing this vision includes putting those cells that do not actually serve an active terminal into a power-save mode, e.g. switching those cells almost completely off. Another, complementary, approach includes significantly reducing or refraining from transmitting broadcast signals that are common in conventional networks. The transmission of these broadcast signals causes a large overhead, in particular for cells operating at less than full load.

The new architecture envisions distinguishing between different types of cells. A first type of cells, in this text referred to as 'SA-cell' is primarily optimized to support the wireless exchange of data with active terminals. The energy-efficiency improvements as outlined above are focused on the SA-cells. A second type of cells, in this text referred to as 'LA-cell' is primarily optimized for other functions in a cellular network, including those also found in conventional networks. Thus, it is envisioned to reduce the overhead in the system to that attributed to the LA-cells.

An LA-cell typically covers a larger area, for example comparable to that of a conventional macrocell. The LA-cells together provide near contiguous coverage in the area desired to be covered, much like in a conventional network. An LA-cell may transmit broadcast and system information, much like a conventional cell; an idle terminal may camp on an LA-cell and may also initiate a signalling connection with the LA-cell, e.g. to perform an LA/RA update or to detach from the network.

An SA-cell covers a smaller area, for example comparable to that of a conventional microcell, picocell or femtocell. The SA-cells together may support a certain bit rate in the near-contiguous area desired to be covered. An SA-cell only transmits signals when and in so far it is needed; it may be regarded to be normally 'off' or in a power-save or stand-by mode. An idle terminal also does not camp on an SA-cell. Although such a network has been referred to as a "Beyond Cellular Green Generation" (BCG2) network, this term may change in the future. Therefore, in the context of the present application, a network having such architecture will be referred to as an "energy-efficient cellular wireless network."

The result of a session setup in an energy-efficient cellular network is illustrated in FIG. 2. If session setup is network-initiated, this is preceded by the terminal receiving a paging message via the LA-cell it is camping on. As shown, the session setup in an energy-efficient cellular network may be sub-divided into two parts. The first part includes the establishment of a signalling connection between the terminal and the LA-cell it currently is camping on, which may include a RACH procedure and RRC connection set-up, similar to legacy networks. After a signalling connection between the terminal and the LA-cell has been established, the second part includes the establishment of a data connection (data session) with an appropriate SA-cell.

Note that, in an energy-efficient network according to this architecture, it may sometimes not be possible to identify an appropriate SA-cell immediately. This may happen e.g. because all SA-cells in the vicinity of the terminal may be in a power-save mode and do not transmit a suitable signal. It may also be the case that some SA-cell is active and that the terminal detects a suitable signal from the SA-cell, but that the active SA-cell cannot optimally support the requested data session from an energy saving perspective (e.g. there is an inactive SA-cell in a better position, e.g. much closer to the terminal). It may also be the case that some SA-cell is active but that the active SA-cell cannot optimally support the requested data session from a quality of service (QoS) perspective (e.g. the active SA-cell cannot support the data session with the requested bit rate, while other inactive SA-cell(s) can).

As can be seen from FIGS. 1 and 2, setting up a session in a network according to this new architecture is different from that in legacy networks. One difference is that the terminal issues a request message to a 'best cell' an idle terminal is camping on but that this cell is, normally, not going to serve the terminal (i.e., the data connection for exchanging the actual user data is set up with another cell). Another difference is that the SA-cell's RAT (Radio Access Technology) to support the data connection need not be the same as the LA-cell's RAT to support the terminal in idle mode, which allows optimization of one or both RATs separately for their respective primary purposes. Yet another difference is that, in the new architecture, the 'best cell' to support the data connection still needs to be found. Consequently, as a part of the session setup procedure in an energy-efficient network, an appropriate cell (SA-cell) needs to be selected to support the data connection with the terminal. To ensure high quality and/or user experience, the session setup, which includes both identifying an appropriate cell and establishing a data connection with it, is preferably performed quickly.

As the foregoing illustrates, what is needed in the art are methods and systems for facilitating establishment of a data connection between a terminal and a SA-cell in an energy-efficient network, such as e.g. a BCG2 network.

SUMMARY OF THE INVENTION

According to one aspect of the present invention, in a telecommunications system comprising at least an LA-cell and a plurality of SA-cells, a method for a terminal to facilitate establishment of a data connection between the terminal and at least one of the plurality of SA-cells is provided. The method includes, while the terminal is in an idle mode and is camping on the LA-cell, the terminal transmitting an information request message (IRM) for the plurality of SA-cells and receiving, from each SA-cell of one or more SA-cells of the plurality of SA-cells, a message comprising at least information indicative of a strength with which the each SA-cell received the IRM. The method further includes based, at least partially, on the messages received from the one or more SA-cells, selecting an SA-cell of the plurality of SA-cells for establishing the data connection between the terminal and the selected SA-cell. Preferably, the telecommunications system comprises a cellular wireless access telecommunications system.

In the context of the embodiments of the present invention, the expressions "LA-cell" and "SA-cell" are used to differentiate between two different types of cells.

The first type of cell, the LA-cell (Large Area cell), refers to a cell that is able to cover a larger area with a smaller bit rate, as compared with the second type of cell. The LA-cell is primarily intended for carrying signaling messages from/ to a terminal, e.g. the LA-cell is intended to at least be able to page a terminal. A terminal in idle mode may further be assumed to 'camp' on at least one of these LA-cells. While the LA-cell is not primarily intended to be used to carry wireless user data from/to a terminal, it is not precluded that other signaling than paging or that also some user data is carried via an LA-cell. In the intended coverage area of the wireless access network it may be assumed that at least one LA-cell is fully operational or, in other words, an LA-cell is 'normally on.'

The second type of cell, the SA-cell (Small Area cell), refers to a cell that is able to cover a smaller area with a higher bit rate, as compared with the LA-cell. The SA-cell is primarily intended to carry user data from/to a terminal over the established data connection (i.e., the SA-cell is primarily intended to handle connections with active terminals). Yet, it is not precluded that also some other information and/or some signalling is carried via an SA-cell. In the intended coverage area of the wireless access network it may be assumed that at least one SA-cell is able to provide coverage. An SA-cell is only fully operational when and to the extent that it is needed or, in other words, an SA-cell is 'normally off.'

According to various embodiments of the present invention, the SA-cells may occur in any mix of frequency bands and/or radio access technologies (RATs). It is also not precluded that there are differently sized SA-cells (e.g. macro, micro, pico and femto SA-cells, with or without a hierarchical organization), where larger SA-cells may e.g. more efficiently serve highly mobile terminals.

As used herein, the expression "data connection between a terminal and an SA-cell" refers to a communication path for a wireless exchange of user data between the terminal and the SA-cell. The communication path for user data, including the section between the terminal and the SA-cell, is usually set up according to a set of parameters, for example, depending on what type of user data needs to be exchanged (e.g. for sending/receiving e-mail, for making a voice or video call, etc.). The set of parameters, commonly referred to in the art as "QoS parameters" or "QoS profile," may include parameters such as e.g. maximum bitrate, guaranteed (minimum) bitrate, bit error ratio and delay/latency.

In contrast, signalling messages exchanged between the terminal and the LA-cell do not contain user data and are exchanged between e.g. the terminal and various entities in the telecommunication system. Signalling messages may be exchanged without establishing a connection or via a "signalling connection" with a modest bit rate and with a quality sufficient for most signalling information to arrive uncorrupted. A signalling connection, when used, is to a large extent also independent of the parameters of the "data connection" it may be associated with.

Further, it is understood that the terms "user data" and "user terminal" do not necessarily imply a presence of a human user and the embodiments of the present invention may also be applicable to e.g. a smartphone checking e-mail without human intervention and to machine-to-machine (M2M) communications. The term "user data" is merely used to differentiate between the actual data that is to be exchange over the data connection and the signaling.

As described herein, a terminal may be either in an "active mode" or an "idle mode." As used herein, the expression "a terminal in an idle mode" refers to a terminal that is neither exchanging user data nor able to exchange user data but is camping on a LA-cell and is monitoring possible paging messages for the terminal from the LA-cell. In other words, the expression "a terminal in an idle mode" is used to describe a terminal which does not have support for the wireless exchange of user data between the terminal and an SA-cell. In contrast, the expression "a terminal in an active mode" refers to a terminal that is either exchanging user data or able to exchange user data via at least one SA-cell. In other words, an active terminal supports or is able to support the wireless exchange of user data between the terminal and the SA-cell(s). These notions of idle mode and active mode may be comparable with like notions in standardized conventional networks but do not necessarily coincide exactly with standardized definitions.

In an embodiment, the IRM comprises a request for establishing the data connection between the terminal and one of the plurality of SA-cells and, optionally, further comprises an indication of a service requested by the terminal and/or an indication of terminal's capabilities.

In an embodiment, the IRM is transmitted more than once.

In an embodiment, the IRM is transmitted upon receiving an indication that the data connection between the terminal and one of the plurality of SA-cells is to be established, and/or in a predetermined pattern.

In an embodiment, the method further comprises establishing the data connection between the terminal and the selected SA-cell.

According to another aspect of the present invention, an LA-cell configured for use in the methods described herein is disclosed. The LA-cell is configured at least for providing a transmit-trigger to the terminal instructing the terminal to transmit the IRM and/or providing a receive-trigger to at least one of the plurality of SA-cells to enter an IRM listening mode, wherein in the IRM listening mode the at least one of the plurality of SA-cells is capable of receiving the IRM, wherein, optionally, the receive-trigger is provided in response to receiving a service request message from the terminal.

According to another aspect of the present invention, an SA-cell configured for use in the methods described herein is disclosed. The SA-cell is configured at least for determining the strength with which the SA-cell received the IRM and providing to the terminal the message comprising at least information indicative of the determined strength.

In an embodiment, the SA-cells provides the message to the terminal more than once.

In an embodiment, the SA-cell is further configured for providing the message using a channel code assigned to the SA-cell and/or for including in the message an identification of the SA-cell.

In an embodiment, the SA-cell is configured for entering an IRM listening mode at predetermined times, e.g. periodically, wherein in the IRM listening mode the SA-cell is capable of receiving the IRM.

In an embodiment, the SA-cell is configured for entering the IRM listening mode in response to receiving a receive-trigger from the LA-cell, the receive-trigger instructing the SA-cell to enter the IRM listening mode, where the receive-trigger is provided to the SA-cell in response to the LA-cell receiving a service request message from the terminal and/or in response to the LA-cell receiving a request to transmit a paging signal to the terminal.

In an embodiment, the SA-cell is further configured for receiving an indication that the data connection is to be established between the SA-cell and the terminal.

According to other aspects of the present invention, a terminal, a computer program with portions (possibly distributed) for performing the various functions described herein, a data carrier for such software portions, and a telecommunications system are disclosed. The telecommunications system may include two or more of the terminal, the LA-cell, and the SA-cell as described herein.

According to yet another aspect of the present invention, in a telecommunications system comprising at least a first SA-cell and one or more additional SA-cells, a method for a terminal in an active mode to facilitate handover of a first data connection to a second data connection is disclosed. The first data connection is a data connection between the terminal and the first SA-cell. The second data connection is a second data connection between the terminal and a second SA-cell of the one or more additional SA-cells. The method includes the terminal transmitting an IRM for the one or more additional SA-cells and receiving, from each SA-cell of one or more SA-cells of the one or more additional SA-cells, a message comprising at least information indicative of a strength with which the each SA-cell received the IRM. The method also includes the terminal, based, at least partially, on the messages received from the one or more SA-cells, selecting the second SA-cell of the one or more additional SA-cells.

Hereinafter, embodiments of the invention will be described in further detail. It should be appreciated, however, that these embodiments may not be construed as limiting the scope of protection for the present invention.

DETAILED DESCRIPTION OF THE DRAWINGS

A description of example embodiments of the invention follows.

The teachings of all patents, published applications and references cited herein are incorporated by reference in their entirety.

Figure 1:
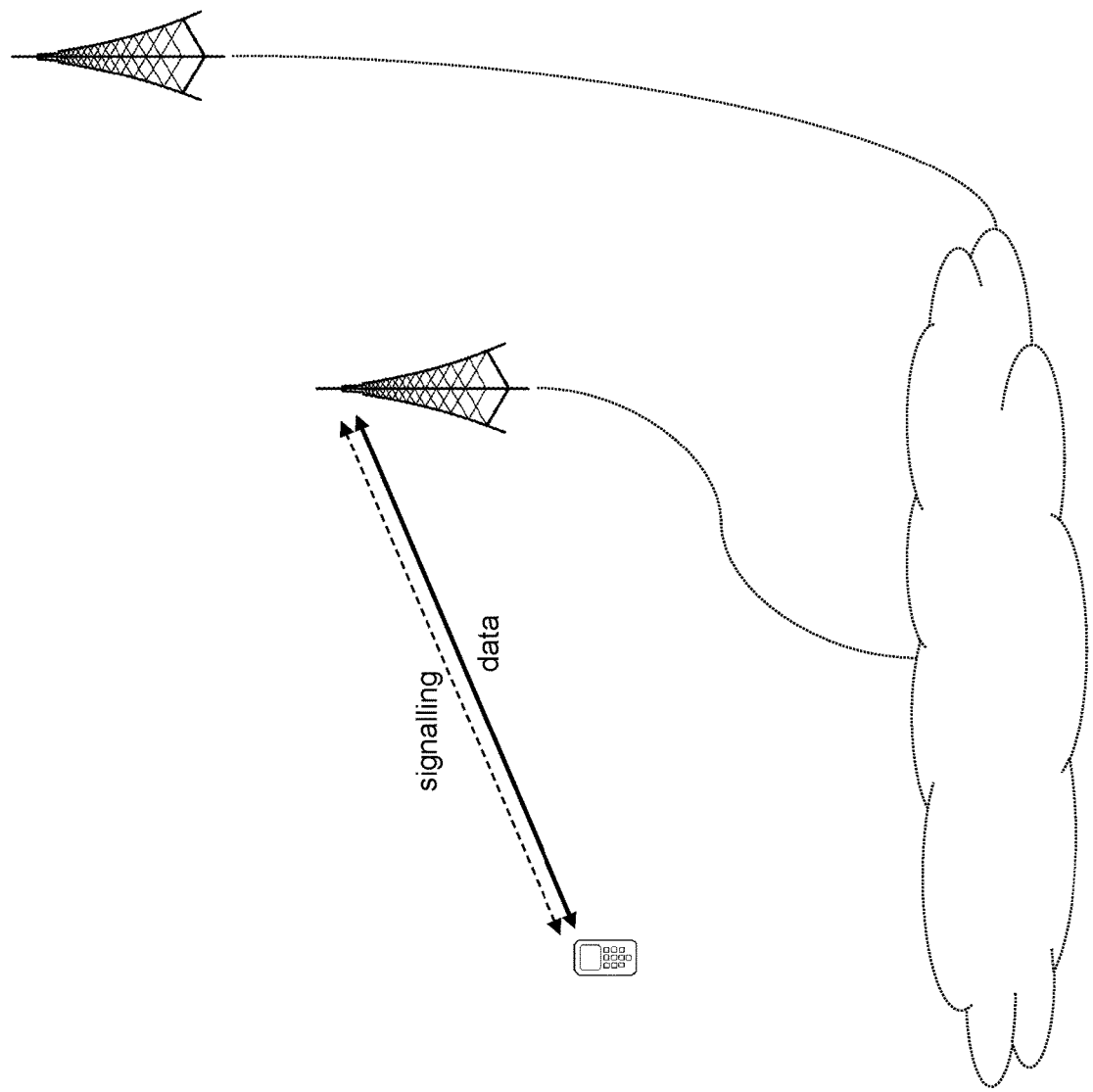
FIG. 1 is a schematic illustration of the result of a session setup in legacy networks.
Figure 2:
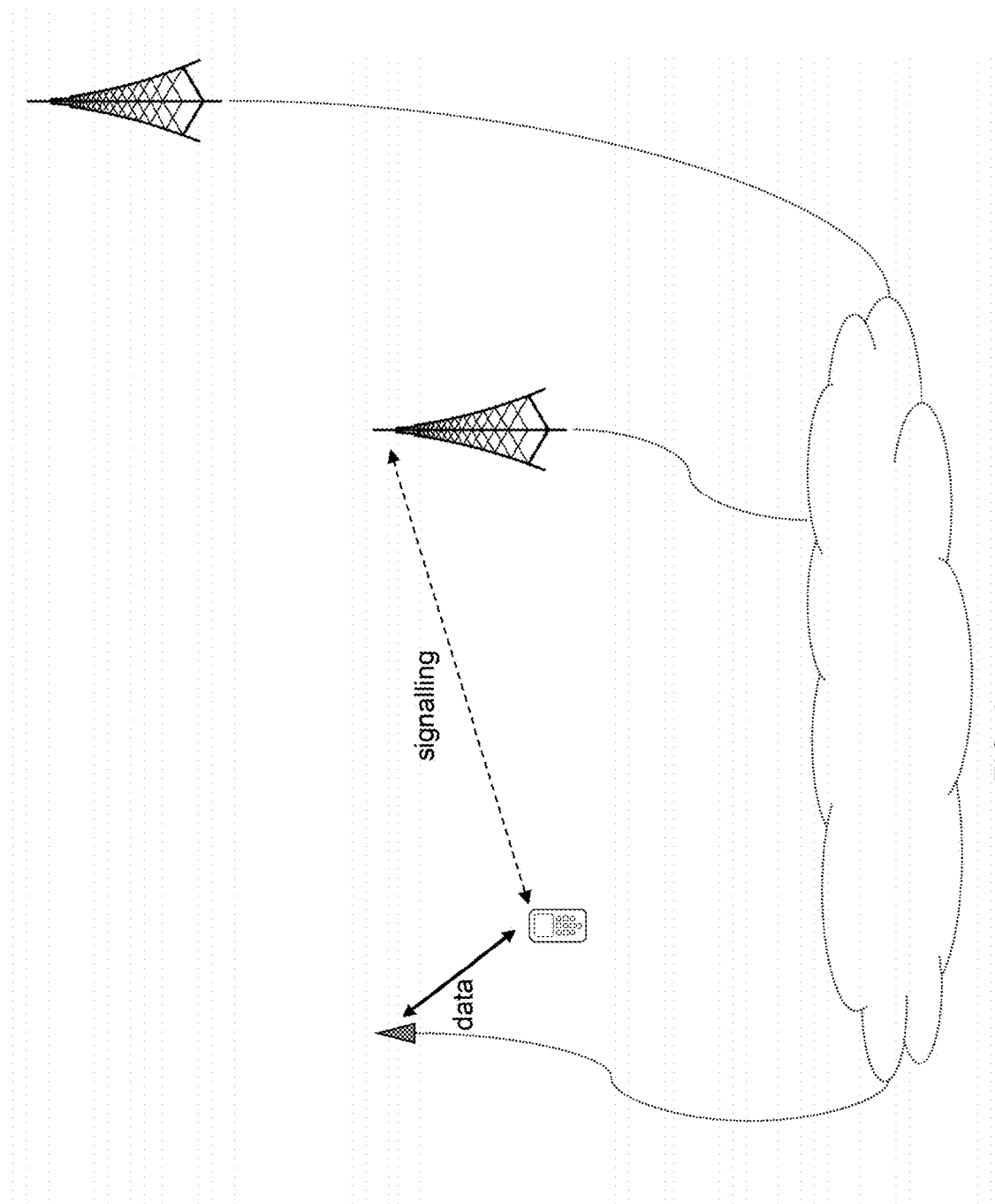
FIG. 2 is a schematic illustration of the result of a session setup in an energy-efficient network, according to an embodiment of the present invention.
Figure 3:
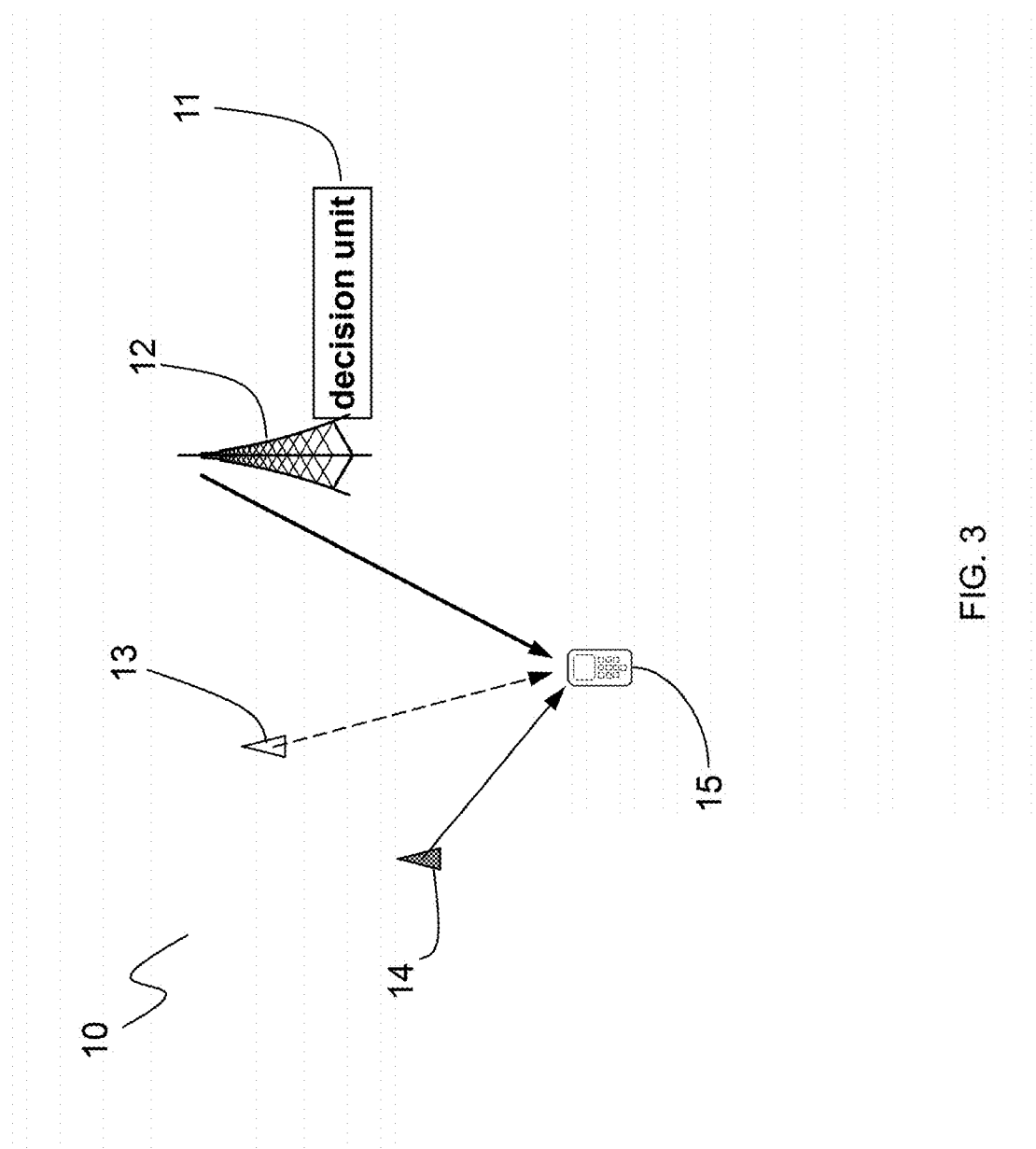
FIG. 3 is a schematic illustration of a telecommunications system, according to an embodiment of the present invention.

FIG. 3 illustrates a telecommunication system 10 according to one embodiment of the present invention. As shown, the telecommunication system 10, which is preferably a cellular wireless access telecommunication system, includes at least a decision unit 11, an LA-cell 12, and SA-cells 13 and 14. FIG. 3 also illustrates a user terminal 15. For clarity reasons, only the most relevant elements of the telecommunication system are illustrated in FIG. 3. Other elements, not shown in FIG. 3, may also be present and are within the scope of the present invention. Such "other elements" may include e.g. additional SA-cells, additional LA-cells, additional terminals, further elements to the telecommunication system and the backhaul links connecting each cell with the telecommunication system and/or with each other.

Below, a general description of each of the decision unit 11, the LA-cell 12, the SA-cells 13, 14, and the terminal 15 is provided. A more detailed description of the functionality of each of these elements is provided in the discussion of the different solutions, following the general description.

The decision unit 11 is a unit which may exchange messages with at least the terminal 15 and, possibly, with the SA-cells 13, 14. In some embodiments, as described in greater detail below, the decision unit 11 may be configured to select one or more SA-cells with which the terminal 15 may establish a data connection. To that end, in one embodiment, the decision unit 11 may include at least a communications interface for exchanging messages, a memory for storing data (possibly received in the messages) and/or computer program instructions, and a processor for processing data, running computer programs, etc. In other embodiments, the decision unit 11 may be implemented in software or in firmware. In yet other embodiments, the decision unit 11 may be implemented as any combination of hardware, software, and firmware.

In the illustrative embodiment of FIG. 3 the decision unit 11 is shown to be a part of the LA-cell 12. However, in other embodiments, the decision unit 11 may be not included in the LA-cell 12, but be a stand-alone unit, be included in a further network node, or be distributed between two or more network nodes (e.g. a part of the functionality of the decision unit 11 may be implemented within the LA-cell 12, while another part may be implemented in a further network node, not shown in FIG. 3). Unless indicated otherwise, discussions provided herein with respect to the decision unit 11 apply both to the embodiments where the decision unit 11 is a part of the LA-cell 12 and where the decision unit 11 is implemented outside of the LA-cell 12.

The LA-cell 12 is an LA-cell cell configured to at least be able to enable terminal 15 to camp on LA-cell 12 and to page the terminal 15 in a conventional manner known in the art. According to some embodiments of the present invention, the LA-cell 12 is also configured to receive service request messages (SRMs) from the terminal 15 indicating that a data connection needs to be established between the terminal 15 and one of the SA-cells for supporting wireless traffic (i.e. wireless exchange of user data), not shown in FIG. 3. While the LA-cell 12 is not primarily intended to be used to carry wireless user data from/to the terminal 15, it is not precluded that other signalling than paging or that also some user data traffic is carried via the LA-cell 12, for example low bit rate traffic (such as a voice call) for the full duration or for a part of the duration of the data session (call).

In comparison with the SA-cells 13 and 14, the LA-cell 12 is configured to cover a larger geographical area with a smaller bit rate. The geographical area where an idle terminal selects the LA-cell to camp on is referred to as the coverage area of the LA-cell. In a properly dimensioned cell, a terminal within that area is usually also capable of successfully receiving the system information and signalling messages from the LA-cell (for example a paging message). This is assumed to also apply in the reverse direction, i.e.

when a terminal, camping on an LA-cell, transmits a signalling message (for example a service request message) to the LA-cell it is camping on, the LA-cell is usually capable of successfully receiving the message. In the intended coverage area of the wireless access network it may be assumed that at least one LA-cell (in FIG. 3, the LA-cell 12) is fully operational or 'normally on' and is capable of supporting exchange of signalling messages with the terminals. In a simplest embodiment, this may mean that the LA-cell 12 is always fully functional ('on'). In other embodiments, power-saving options suitable for LA-cells may be applied to the LA-cell 12, meaning that the LA-cell 12 would not necessarily always be 'on'.

The terminal 15 may be a terminal operated by an actual human user, such as e.g. a mobile phone with which the user can make a voice call or browse the Internet, but may also be a smart phone or a blackberry operating without human intervention (e.g. sending/receiving e mail), and may also be an M2M device, such as e.g. a smart electricity meter or a camera surveillance device.

The terminal 15 may be in an active mode or in an idle mode. As used herein, the terminal 15 is said to be in an idle mode while there is no support for a wireless exchange of user data or traffic between the terminal 15 and the SA-cells 13 or 14. As used herein, the terminal 15 is said to be in an active mode when it is able to exchange data with at least one of the SA-cells 13, 14. Note that while these notions of idle mode and active mode may be comparable with the meaning of like terms in standardized conventional networks, as used herein, they do not necessarily coincide exactly with such standardized definitions.

Further, the terminal 15 may support some form of power-saving options (i.e., be in a power-save mode or in an operational mode, where the terminal consumes less power in the power-save mode than in the operational mode). Since the differentiation between power-save and operational modes is based on the amount of power consumed by the terminal, while the differentiation between idle and active modes is based on the presence of the support for wireless exchange of user data with the SA-cells, a terminal may e.g. be in the operational mode but still be an idle terminal (or the terminal in the operational mode may be in active mode). Similarly, a terminal in a power-save mode can be either active or idle, depending on whether the terminal supports wireless exchange of user data with at least one of the SA-cells. Most common, however, would be a situation where an idle terminal in a power-save mode "wakes up" (i.e. exits the power-save mode and enters the operational mode) to perform certain actions to facilitate establishment of a data connection with at least one SA-cell, after which the terminal becomes "active" (and operational). Since the embodiments of the present invention deal with a session setup for the terminal (i.e. establishment of a data connection with one or more SA-cells), in the following description, the differentiation is mainly made between idle and active modes of the terminal.

The terminal 15 in an idle mode may be assumed to 'camp' on at least the LA-cell 12, which may also be realized in a conventional manner. For example, the LA-cells may broadcast a pilot signal or a beacon signal which can be received by the terminal 15 which then uses the information contained in the received signal to select or re-select the LA-cell to camp on. In FIG. 3, the signals transmitted by LA-cell 12 and received by the terminal 15 are illustrated as a solid arrow. In an embodiment, the terminal 15 may be capable of informing the network about the change of location/routing area in order to facilitate the paging function of the LA-cell 12, not shown in FIG. 3.

The SA-cells 13 and 14 are data cells, primarily in-tended to carry user data traffic from/to the terminal 15 over the data connections established for that purpose. However, it is not precluded that also some other information and/or some signalling is carried via one or more of the SA-cells.

Each of the SA-cells 13 and 14 are intended to be capable of covering smaller areas with a higher bit rate, as opposed to the LA-cell 12. In a typical deployment scenario, the areas that can possibly be covered by nearby SA-cells may show a considerable overlap. In the intended coverage area of the wireless access network it may be assumed that at least one of the SA-cells 13, 14 is able to provide coverage. An SA-cell is only fully operational when and to the extent that it is needed or, in other words, is 'normally off'. An SA-cell is assumed to support at least one form of power-saving, e.g. a power-save mode or stand-by mode. To that end, an exemplary embodiment of FIG. 3 illustrates that the SA-cell 13 is an SA-cell in a power-save mode (indicated in FIG. 3 as a white triangle), while the SA-cell 14 is an SA-cell in an active mode (indicated in FIG. 3 as a dark triangle). In FIG. 3, the signals transmitted by active SA-cell 14 and received by the terminal 15 are illustrated as a solid arrow, while a possible signal transmitted by SA-cell 13, which is in power-save mode, and received by the terminal 15 is illustrated as a dashed arrow.

Each of the terminal 15, the LA-cell 12, and the SA-cells 13, 14 may include at least one or more of a processor, a memory unit, and a communications interface configured for carrying out functionalities of these units described herein.

Figure 4:
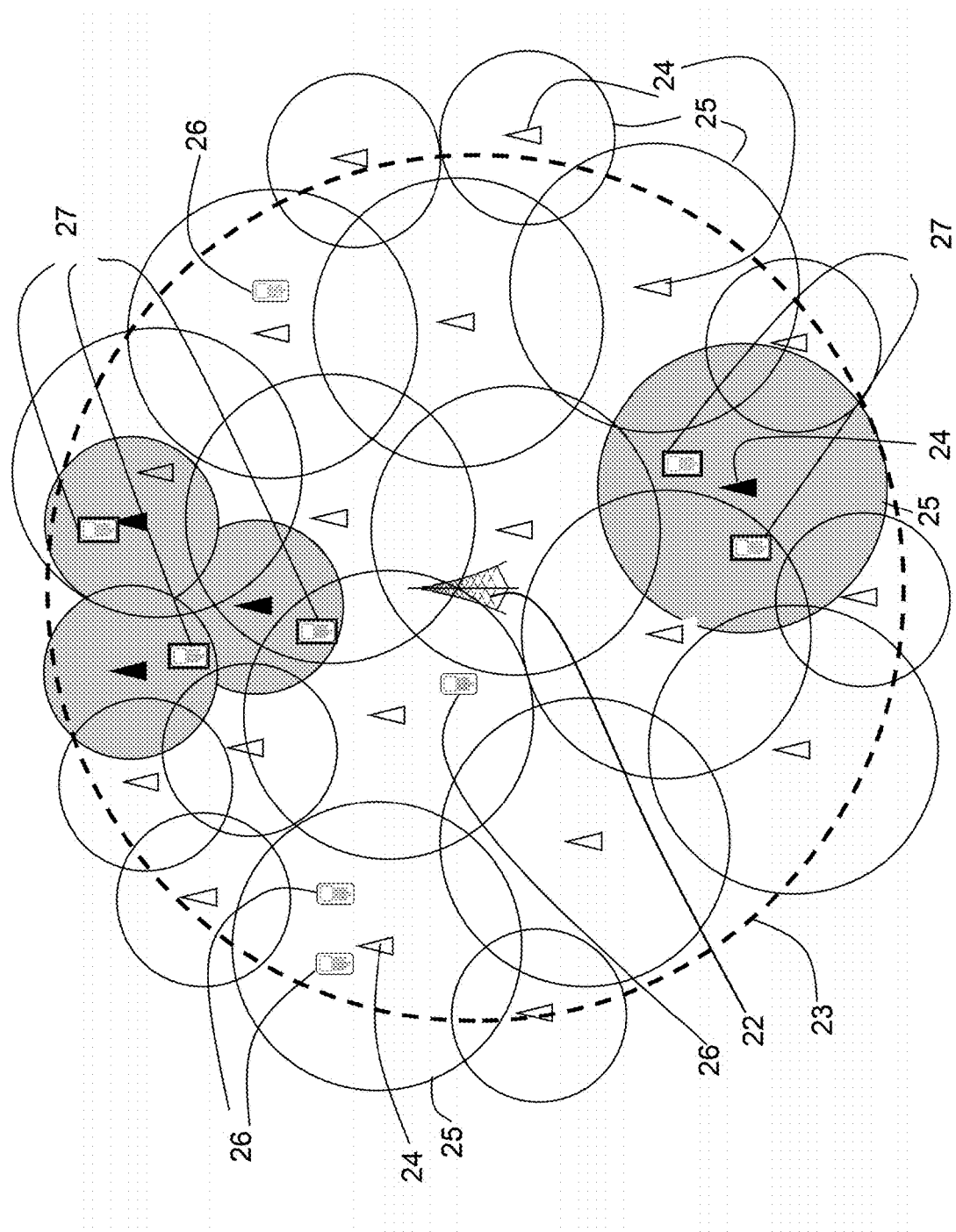
FIG. 4 is a schematic illustration of coverage areas of the LA-cell and a plurality of SA-cells in a telecommunications network, according to one embodiment of the present invention.

FIG. 4 is a schematic illustration of coverage areas of an LA-cell and a plurality of SA-cells in a telecommunications network, according to one embodiment of the present invention. As shown in FIG. 4, an LA-cell 22, which could be the LA-cell 12 illustrated in FIG. 3, may have a relatively large coverage area, shown with a dashed circle 23. Each of the plurality of SA-cells, shown as triangles, such as the triangles 24, could be the SA-cells 13, 14 illustrated in FIG. 3. The SA-cells 24 may have different, relatively smaller coverage areas, shown with solid circles, such as circles 25. FIG. 4 further illustrates idle mode terminals 26 and active mode terminals 27 (the active mode terminals indicated as bold outlined terminals). Each of the terminals 26 and 27 could be the terminal 15 illustrated in FIG. 3 and could be within one or more of the coverage areas 25. The idle mode terminals 26 within the coverage area 23 of the LA-cell 22 are said to be camping on the LA-cell 22. The SA-cells 24 having coverage areas 25 shown in white are intended to illustrate the SA-cells in the power-save mode, while the SA-cells 24 having coverage areas 25 shown in dark grey are intended to illustrate the SA-cells in the active mode and have ongoing data sessions with one or more active terminals 27. Of course, in other embodiments, the coverage areas 23 and 25 do not have to be circular.

Solution #1: Session Setup Via the Terminal in Idle Mode Measuring Signals Transmitted by Sa-Cells In the context as illustrated in FIGS. 3 and 4 and described above, the terminal 15 is first assumed to be an idle terminal which intends to become active, either because it receives a page (e.g. from the LA-cell the terminal camps on, e.g. the LA-cell 12) or because the terminal 15 (possibly via the user of the terminal or via an application running on the terminal) indicates the desire to exchange user data. Embodiments of the present invention address the problem of selecting (assigning) a suitable SA-cell (one already active or one currently in power-save mode) for that terminal.

For reference, in a conventional network, the terminal would initiate active mode via the cell that it is currently camping on (and, when applicable, via which the terminal received a page) and also the resulting data connection for carrying user data traffic is supported by the same cell (not excluding a handover or directed retry to a different cell). In contrast, the following provides solutions for an energy-efficient network as illustrated in FIG. 3 where signaling messages between the terminal and the network are exchanged using the LA-cell, but a data connection for exchanging user data is established with one of the SA-cells.

Embodiments of this solution are based on the idea that at least some of the SA-cells in a telecommunications network are configured to emit signals which the terminal 15 is able to receive while the terminal is in the idle mode. While still in the idle mode and camping on the LA-cell 12, the terminal 15 is further configured to analyze the received signals. More specifically, the terminal 15 in the idle mode is configured to determine properties representing propagation conditions of the received signals, such as e.g. a signal strength and/or a path loss estimate for the signal. The terminal 15 is also configured to provide a report to the decision unit 11, via the LA-cell 12, containing at least the information regarding at least some of the determined properties for at least some of the SA-cells for which the terminal 15 received and analyzed the signals. Based, at least partially, on the information contained in the report received from the terminal 15, the decision unit 11 is then able to make a selection of at least one of the SA-cells in the tele-communications network to serve the terminal 15. In other words, the decision unit 11 is able to select one or more SA-cells with which the terminal 15 could establish the data connection for exchanging user data.

In this manner, the terminal 15 facilitates establishment of the data connection between the terminal 15 and one of the SA-cells by providing to the decision unit 11 information regarding the propagation conditions between the terminal 15 and various SA-cells. When the decision unit 11 has such information available, a selection of the most appropriate SA-cell for establishing the data connection may be performed quicker and/or more accurately.

Figure 5:
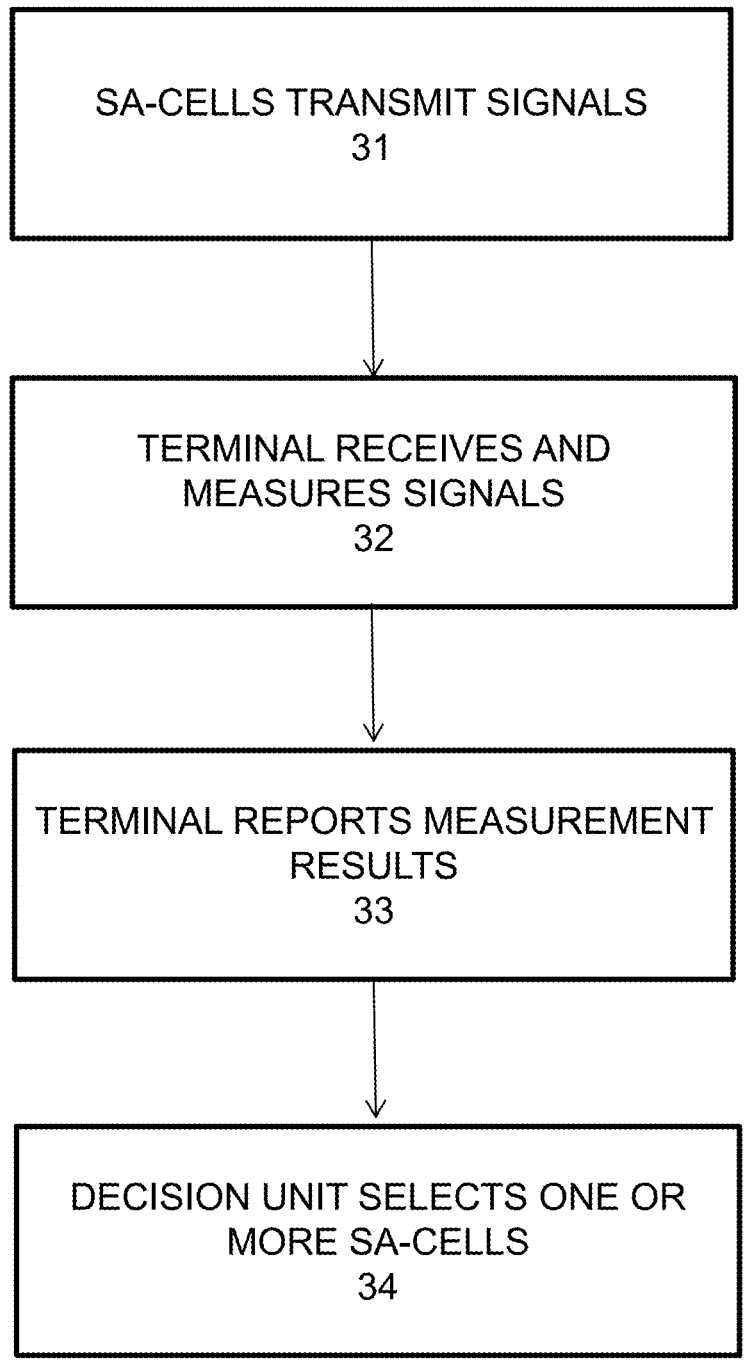
FIG. 5 sets forth a flow diagram of method steps for selecting one or more SA-cells when the terminal measures signals from the SA-cells, according to one embodiment of the present invention.

FIG. 5 sets forth a flow diagram of method steps for selecting one or more SA-cells when the terminal 15 measures signals from the SA-cells, according to one embodiment of the present invention. While the method steps are described in conjunction with FIG. 3, persons skilled in the art will recognize that any system configured to perform the method steps, in any order, is within the scope of the present invention.

The method begins in step 31, where one or more SA-cells in the network transmit signals intended for the terminal 15. In step 32, the terminal 15 is configured to receive and process at least some of the signals transmitted by the SA-cells.

According to the embodiments of the present invention, not only active SA-cells may emit signals that the terminal 15 may receive and analyze, but also SA-cells in a power-save mode. The latter is particularly advantageous for energy-efficient networks because transmitting signals (e.g. pilot and system information) can amount to a substantial portion of the cell's maximum transmit power, such that a cell without any traffic or a cell carrying little traffic is very energy-inefficient. However, according to some embodiments of the present invention, an SA-cell in a power-save mode may also be configured to emit a signal that the terminal 15 can receive and analyze. To that end, the SA-cell in a power-save mode may be configured to only emit a so-called "presence signal," e.g. a signal emitted intermittently, for a fraction of the time. For example, such a SA-cell may be configured to emit the signal for 1 second, followed by 9 seconds of not emitting the signal, corresponding to a fraction $1/10$th. Varying the duty cycle (i.e. the ratio between the "on" and "on"+"off" times for emitting the signal) in this manner allows reducing the power of the emitted presence signal to roughly the same fraction, as opposed to a conventional approach where a transmission would be substantially 100% of the time. In one embodiment, the maximum duty cycle for an intermittent signal emitted by an SA-cell could be e.g. $1/8$th, which could result in an 8-fold power saving in comparison with the same signal emitted continuously.

The signals emitted by the SA-cells should be suitable for the terminal 15 in an idle mode to detect and analyze. This means that the signals should be lasting sufficiently long and should be decodable by the terminal. The signals should preferably be sufficiently frequent to allow the terminal 15 to receive and analyze the intermittent signal without excessive waiting time, should be emitted e.g. once per second.

In addition, the signals should be such that the terminal can differentiate between the signals received from the different SA-cells. In one embodiment, the differentiation may be done by each SA-cell emitting a signal that is uniquely coded. In another embodiment, each SA-cell may include its identification in the signal. In yet another embodiment, each SA-cell may emit signals via a different channel and the terminal 15 may be configured to "listen" to these different channels. Further, if the SA-cells emit their signals intermittently, the terminal 15 may also differentiate between the SA-cells based on the time the signal is received (provided that there is synchronization between the terminal and the SA-cells and the terminal has access to information indicative of the times when the signals from each respective SA-cells should be expected to be received). Of course, a combination of these embodiments and other manners for differentiating between the signals received from different SA-cells are also possible and within the scope of the present invention.

In one embodiment, identification of the SA-cell provided in any one of the manners described above could be a globally unique identification which allows global differentiation between each SA-cell. However, such a globally unique identification is not always necessary. In other embodiments, the identification may be such that it uniquely identifies a particular SA-cell in e.g. a particular, relevant geographical area (e.g. the SA-cell which provides at least partial coverage in the coverage area of the LA-cell).

In an embodiment particularly useful for the SA-cells in power-save mode, the transmission of the signals by the SA-cells may be configured to take place in a predetermined pattern (e.g. periodically). An idle terminal in a power-save mode may then be configured to synchronize its "wake-up" times for receiving and analyzing the signals of at least the most relevant of these SA-cells.

With a predetermined transmission pattern of the SA-cells, it may be an option to organize the transmission instances of the presence signals of the SA-cells (at least the ones of particular relevance to the terminal, e.g. those in the vicinity of each other) such that these transmissions, as far as possible, do not consistently coincide. This may be beneficial for several reasons. One reason is that it may enable the terminal to more easily differentiate between the signals received from the different SA-cells. Another reason is that it may allow the terminal to make assessments of several SA-cell presence signals in a quick succession, e.g.

one SA-cell at the time, and without interference from presence signals of other SA-cells nearby the terminal (possibly with received signal strengths in the same range as from the first SA-cell).

An alternative option for the predetermined transmission pattern of the SA-cells could be to organize the transmission instances of the presence signals of the SA-cells so that the transmissions would substantially coincide. This option is viable if a terminal is able to perform measurements on several SA-cell presence signals at the same time, which requires more processing power in the terminal. This would allow the terminal to make several SA-cell presence signal assessments at a time and then go back to the power-save mode again.

In one embodiment, an idle terminal in a power-save mode may exit the power-save mode at some predetermined times in order to receive and measure the signals from the SA-cells. The terminal may do so e.g. periodically or upon receiving a paging signal from the LA-cell indicating to the terminal that, for example, a data connection needs to be established or that a report is requested for e.g. network management purposes and/or for terminal localization. In another embodiment, an idle terminal may be configured to only start monitoring the signals from the SA-cells when the terminal needs to establish a data connection. Such an embodiment would allow saving power during the time when the terminal is in idle mode, but may result in increased latency before the terminal is able to transmit the relevant information to the decision unit, thus increasing the latency in establishing the data connection. For many applications, e.g. checking and retrieving new e mails, such an increase in latency would have no significant effect on the application.

In yet another embodiment, one or more of the SA-cells in a power-save mode may be triggered by the LA-cell to emit the signal to be received by the terminal. This may be done in response to e.g. the LA-cell receiving a service request message from the terminal or when (or before) the LA-cell pages the terminal. If the terminal is also in a power-save mode, the LA-cell could synchronize the trigger for the SA-cells to transmit the signals with a trigger for the terminal to receive and analyze the signals. This embodiment also holds for the one or more SA-cells in a power-save mode being triggered by the decision unit 11, which could either be a part of the LA-cell 12 or be an entity outside of the LA-cell 12.

A trigger for the SA-cells to transmit the signals could be based, at least partially, on one or more of a terminal location estimate, an estimate of the accuracy of the terminal location estimate, and activity status of the SA-cells in the vicinity of the estimated terminal location. In one embodiment, the terminal location estimate and the estimate of the accuracy of the location estimate could be provided to the LA-cell by the terminal because the terminal has a built-in GPS receiver which is typically able to provide both a position estimate and an indication of the accuracy of the position estimate. In another embodiment, these values may be derived by the LA-cell from the contents of a service request message received from the terminal. This may be done e.g. by the terminal providing signal levels of all kinds of signals received (e.g. active SA-cell signals, WiFi hotspot signals, LA-cell signals, etc.) The LA-cell (or a separate location estimating unit associated with the LA-cell) may then process this information into a position estimate and an accuracy estimate.

The terminal 15 may be configured to maintain a list of at least the most recent and most relevant results for the measured signals together with the indication of the corresponding SA-cells.

In step 33, the terminal 15 is configured to provide a report to the decision unit 11 regarding at least some of the determined properties the SA-cells that the terminal analyzed. The terminal 15 may be configured to provide the report to the decision unit 11 via the LA-cell 12. Such an embodiment may be advantageous because the LA-cell may be configured to add information to the report passed to the decision unit, such as e.g. an identification of the LA-cell. In addition, the decision unit 11 having the identification of the LA-cell may further facilitate identification of the SA-cells about which the report contains information.

In one embodiment, the terminal 15 may provide the report periodically, even when there is no immediate need for establishing the data connection. Such an embodiment has the advantage that the decision unit 11 may have sufficient information available for selecting the most appropriate SA-cell to serve the terminal when the data connection does need to be established. It may also provide the network with more accurate information about the terminal location than just the location/routing area, which information may be relevant for e.g. statistical purposes.

In another embodiment, the terminal 15 may only provide the report upon receiving a paging signal from the LA-cell or when the terminal wants to become active (i.e. when a data connection needs to be established). In the latter case, the terminal may be configured to send a service request message (SRM) to the network via the LA-cell and may include the report in the SRM. Thus, the report is then provided to the decision unit as a part of a connection setup procedure.

As previously described, the report includes at least information regarding at least some of the determined properties for at least some of the SA-cells for which the terminal 15 received and analyzed the signals. In other words, out of all of the SA-cells in the telecommunications network (or at least the plurality of the SA-cells in the vicinity of the terminal), the terminal may receive signals from only some of these cells. The terminal may then analyze not all of the received signals, but only some of those (e.g. because some signals may be impossible to analyze or because they may be associated with the SA-cells that the terminal is not interested in establishing a data connection with). Further, the terminal may decide to include in the report not all of the information regarding the propagation conditions for all of the analyzed SA-cells, but only the information for some of the analyzed SA-cells and/or only part of the determined information. For example, the terminal may decide to not include the signal strengths for the most relevant SA-cells, but to include the determined path loss estimates, e.g. because the path loss is considered to be more relevant to the decision unit and/or to limit the size of the report and/or when results for many SA-cells have been determined.

In one embodiment, the report may also include one or more of the following: an identification of each SA-cell for which information is provided, identifications of the SA-cells for which the signals were received but for which the information is not provided in the report, an indication of which SA-cells are active and which are in a power-save mode, and a 1 bit flag indicating that there is no coverage provided by a particular SA-cell at the location where the service is requested.

If the report is received by the decision unit 11 when a data connection needs to be established (i.e. when the terminal has been paged or the terminal indicates a desire to establish a data connection), the decision unit 11 then may proceed, in step 34, to use at least some of the information provided in the report to select one or more SA-cells with which the terminal may establish the data connection. For example, in one embodiment, the decision unit 11 may take into consideration path loss estimates provided in the report and select the SA-cell with the lowest path loss estimate (e.g. the SA-cell closest to the terminal) as the cell for serving the terminal. The decision unit 11 may, however, also take other information into consideration when making the selection, such as e.g. power and/or load considerations on the candidate SA-cells, capabilities of the SA-cells and the terminal (including e.g. the supported RATs), the type of the required service, and the urgency of establishing the data connection (i.e., whether establishing the service is time-critical or not). For example, the most suitable SA-cell for the terminal could be not necessarily the SA-cell with the lowest path loss to the terminal because it may be more suitable to keep the closest SA-cell in a power-save mode (the indication of which could be provided in the report) and to select a different, e.g. already active, SA-cell for serving the terminal. In another example, it could be that the closest SA-cell is already heavily loaded and that a different, more distant, SA-cell is more suitable. In yet another example, it could be that the closest SA-cell supports a less energy-efficient RAT than a different, more distant, SA-cell. In yet one more example it could be that the SA-cell indicated in the report as having the highest signal strength and/or the lowest path loss estimate does not have the capabilities for carrying a particular service and, therefore, the "next best" SA-cell is selected from the ones provided in the report that does have the required capabilities. Alternatively, after evaluating the report, the decision unit 11 may decide that none of the SA-cells are suitable for carrying the service (this may particularly be the case for time-critical services and/or when the 1 bit flag(s) in the report indicates that there currently is no coverage by any SA-cell at the location where the service is requested) and that the LA-cell instead should serve the session, possibly with a reduced bit rate and/or possibly only temporarily, e.g. until a suitable SA-cell becomes available.

If there is no need to establish the data connection at the time when the report is received, the decision unit 11 may be configured to store the report for later use and evaluation. Alternatively, the decision unit may still go through the process of selecting one or more SA-cells that could serve the terminal in case there is a need to establish a data connection and store that information, possibly along with the report.

Once one or more SA-cells are selected by the decision unit 11 as the most appropriate SA-cells for establishing the data connection with the terminal, the decision unit 11 may indicate the selected SA-cells to the terminal. In one embodiment, such indication may be provided via the LA-cell (e.g. in response to receiving a SRM received from the terminal via the LA-cell). In this embodiment, the decision unit 11 may provide an indication also to the selected SA-cells to inform these SA-cells that a session set up is to be expected. In another embodiment, such indication may be provided via one or more of the selected SA-cells. The latter embodiment assumes that a channel (with mutually known resource details) between the terminal and the selected SA-cell can be made available, along which channel an SA-cell may initiate the set up of a data connection to the terminal. In both these embodiments, the selected SA-cell(s) may be provided with further information related to the terminal and/or the subscription (such as, for example, data connection parameters and/or authentication information and/or encryption keys) in order to facilitate a more speedy session set up. This information may be supplied by the decision unit and/or may be requested by the decision unit to be supplied from a data base (such as the HLR/VLR (Home Location Register/Visitor Location Register) to the selected SA-cells.

If any of the selected SA-cells are in a power-save mode, the decision unit 11 may further be configured to activate the selected SA-cells (possibly via the LA-cell).

The terminal 15 may further be configured for establishing the data connection (i.e., setting up a traffic channel) with the selected one or more SA-cell. Further, a route for the traffic (and the associated signaling) may be set up connecting the selected SA-cell(s) and the network.

Once the decision unit 11 knows the identities of the selected SA-cells, the decision unit 11 may assist in and prepare for setting up the route for the traffic connecting the selected SA-cells and the network. This may also be performed by LA-cell 12 when decision unit 11 is within the LA-cell or when the decision unit provides the information to the LA-cell.

In a cellular wireless telecommunication system it may happen that a terminal in active mode, having a connection with a particular cell, moves out of (the coverage area of) that cell and into (the coverage area of) another cell. Then a so-called handover (handoff) may be performed, meaning that the connection between the terminal and the current cell (source cell) is transferred (handed over) to a connection between the terminal and a different cell (target cell).

Solution #1 as described above may also be used in an energy-efficient wireless network to facilitate a handover of the data connection between an active terminal and the SA-cell it has established the data connection with to another, different, SA-cell.

An active terminal may perform measurements on signals received from various SA-cells as described above, e.g. periodically and/or when the signal received from the SA-cell it has established a data connection with drops below a predetermined threshold and/or when triggered by the network. The terminal may then provide the report to the decision unit via the LA-cell. The decision unit may evaluate the information contained in the report received from the terminal and, taking into account considerations similar to the ones described above, select a different SA-cell as target SA-cell for a handover.

As described above, the decision unit may further inform the terminal and/or the LA-cell and/or the involved (source and target) SA-cells.

Solution #2: Session Setup Via Sa-Cells Measuring Signal Transmitted by the Terminal in Idle Mode and the Terminal Selecting the Sa-Cell Based on the Measurements Similar to the solution #1 described above, in the context as illustrated in FIGS. 3 and 4, the terminal 15 is assumed to be an idle terminal which may, in the future, have to transfer to an active mode, either because it receives a page (e.g. from the LA-cell the terminal camps on, e.g. the LA-cell 12) or because the terminal 15 (possibly via the user of the terminal) initiates exchange of user data. Similar to the solution #1, embodiments of the solution #2 also address the problem of selecting (assigning) a suitable SA-cell (one already active or one currently in power-save mode) for that terminal.

Embodiments of solution #2 are based on the idea that a terminal in the idle mode is configured to emit a signal, referred to herein as an information request message (IRM), intended to be received by one of more of the SA-cells in the telecommunications network. In some ways, the IRM may be comparable to the SRM, described above, that the terminal 15 transmits to the LA-cell when the terminal wishes to initiate a setup of the signaling connection with the LA-cell. The IRM is used to have the SA-cells receiving the IRM to perform measurements on the received signal, e.g. to determine the strength with which the signal was received. Similar to the SRM, the IRM may also be used by the terminal to indicate that the terminal wishes to establish a connection and, optionally, to include parameters indicative of the requested connection and/or of the terminal's capabilities. Unlike the SRM, the IRM is intended to be received by the SA-cells and is intended to indicate to the SA-cells that the terminal may need to setup a data connection with at least one of them.

Preferably, the IRM is transmitted such that it may be easily received and decoded by an SA-cell, even more preferably also when the SA-cell is in power-save mode. The IRM may be transmitted on a particular separate radio interface which is different from any of the RATs the terminal is capable of employing for supporting signaling and/or data connections. However, it is not precluded that the IRM is transmitted using a RAT the terminal is capable of employing for supporting a signaling connection and/or a data connection, for example the LA-cell's RAT the terminal is camping on (in which case different frequencies and/or different codes could be used, as known in the art). The transmission of the IRM further differs from the SRM in that the SRM is directed to and addressed to a particular cell (i.e. the LA-cell that the terminal identified and is currently camping on) and has a purpose to e.g. establish a signaling connection with that particular cell. In contrast, the IRM is not directed to nor addressed to any particular cell (the IRM is broadcast) and has a purpose to e.g. identify one or more cells (SA-cells).

At least some of the SA-cells in the telecommunication system may be able to receive the IRM transmitted by the terminal and determine the signal strength with which they received the IRM. At least some of those SA-cells that determined the signal strength of the received IRM can then provide messages to the terminal indicating the determined strength. At least partially based on such messages received from the SA-cells, the terminal can then make a selection of one or more of the most appropriate SA-cells for establishing the data connection with.

In this manner, the terminal 15 facilitates establishment of the data connection between the terminal 15 and one of the SA-cells by first enabling the SA-cells to obtain information indicative of the propagation conditions between the terminal 15 and various SA-cells (e.g., signal strength) and then collecting the obtained information from the SA-cells in order to select an appropriate SA-cell for establishing the data connection. As a result, establishment of the data connection may be performed quicker and/or more accurately.

Figure 6:
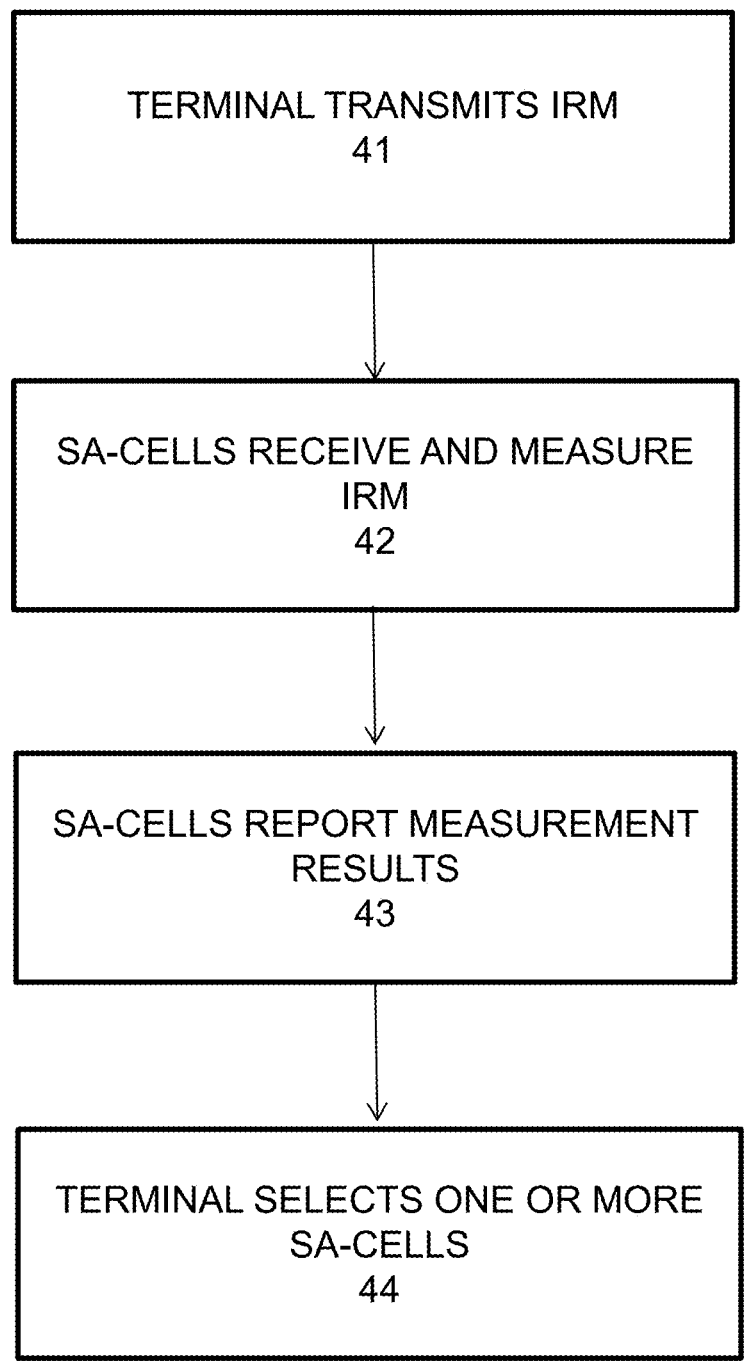
FIG. 6 sets forth a flow diagram of method steps for selecting one or more SA-cells when the terminal transmits an information request message, according to one embodiment of the present invention.

FIG. 6 sets forth a flow diagram of method steps for selecting one or more of the SA-cells 13, 14 when the terminal 15 transmits an information request message, according to one embodiment of the present invention. While the method steps are described in conjunction with FIG. 3, persons skilled in the art will recognize that any system configured to perform the method steps, in any order, is within the scope of the present invention.

The method begins in step 41 where the terminal 15 in an idle mode transmits an IRM. In one embodiment, the terminal 15 may be configured to transmit the IRM at some predetermined times and/or at some predetermined pattern, even though there is no immediate need to establish a data connection with any of the SA-cells. In other embodiments, the terminal 15 may be configured to transmit the IRM when the terminal receives an indication that the data connection between the terminal and one of the SA-cells should be established. Such an indication could e.g. be a paging message received from the LA-cell 12 on which the idle terminal 15 is camping or be an indication from the user of the terminal or an application running on the terminal wishing to exchange user data over the established data connection.

In one embodiment, the IRM may be transmitted via a broadcast channel. The IRM is not intended for and not directed towards the LA-cell (as opposed to e.g. a service request message typically used in conventional networks) but is intended for SA-cells which may potentially provide service to the terminal 15. To that end, the IRM could also include information indicative of the request of the terminal for establishing a data connection between the terminal and one of the SA-cells.

The IRM may include at least some means that would enable the SA-cells receiving the message to identify the terminal that sent it so that the SA-cells can differentiate between the IRMs received from different terminals. In one embodiment, the differentiation may be done by the terminal including its (possibly partial) identification in the IRM. Instead of or in addition to a direct identification of the terminal (such as the full or partial terminal ID), the terminal may include a kind of reference (tag or label) in the IRM. Such a reference may enable the SA-cell to discriminate between IRMs received from different terminals. Further, the SA-cell may include (e.g. copy) the received reference (tag or label) in the response message, thus also enabling the terminal to discriminate between response messages relating its own IRM and those that might be received but relate to IRMs transmitted by different terminals. Selecting a randomized number as reference (tag or label) for the IRM may serve this purpose.

The (partial) identification may e.g. be coded in the contents of the IRM and/or may be coded by transmitting the IRM on one or more of multiple frequencies and/or by transmitting the IRM with one or more of multiple channel codes. In another embodiment, the differentiation may be done by the terminal transmitting the IRM at a particular time, for example in one or more of multiple time slots which time slots may be repeated in a predetermined pattern, e.g. periodically. The SA-cell can then differentiate between the terminals based on the times or time windows the IRMs are received (provided that there is synchronization between the terminal and the SA-cells). Of course, a combination of these embodiments and other manners for differentiating between the signals received from different terminals are also possible and within the scope of the present invention.

In one embodiment, identification of the terminal provided in any one of the manners described above could be a globally unique identification which allows global differentiation between each terminal. However, such a globally unique identification is not always necessary. In other embodiments, the identification may be such that it uniquely identifies a particular terminal in e.g. a particular, relevant geographical area (e.g. the terminal in the coverage area of the SA-cell).

In yet another embodiment, the terminal may be configured to include in the IRM an identification of the network to which the terminal belongs. By providing such identification in the IRM, the SA-cell receiving the IRM can differentiate between the IRMs received from terminals belonging to different networks and then choose whether or not to respond. For example, the SA-cell may choose not to respond when the IRM is sent by a terminal in a competitor's network. In this case, the provided identification does not need to be terminal-specific. It would be sufficient to only identify the network that the terminal belong to.

The IRM may also include an indication of access priority. For example, an emergency response terminal or a consumer terminal making an emergency call may include an indication of high access priority or an M2M terminal (e.g. electricity meter) may include an indication of low access priority. By providing such an indication in the IRM, the SA-cell receiving the IRM can differentiate between the IRMs received from terminals and/or purposes having different access priorities and then choose whether or not to respond.

Further, the IRM should be such as to allow the receiving SA-cell to determine the signal strength with which the IRM is received and/or to estimate the path loss between the terminal and the receiving SA-cell.

Optionally, the IRM may include an indication of the service(s) requested and/or the terminal capabilities, which may be relevant to a SA-cell receiving the IRM in determining to what extent the SA-cell is capable and able to provide the requested service. The terminal capabilities that could be identified in the IRM include e.g. one or more of supported frequency band(s), supported RAT(s), supported mode(s), power with which the IRM is sent by the terminal, supported (maximum) terminal power, and requested (minimum) bit rate.

In one embodiment, the terminal 15 may transmit the IRM with a relatively high power in order to maximize the likelihood that at least one suitable SA-cell is able to detect the IRM. In one further embodiment, the terminal may transmit the IRM at the maximum terminal's transmitting power. In an alternative embodiment, the terminal 15 may decide to transmit the IRM at still relatively high power, but at less than the maximum transmitting power. This could be sufficient if, for example, the terminal already has measured signals from at least one suitable active SA-cell and, therefore, there is no need to transmit the IRM with more power than to overcome the path loss to the best currently active SA-cell. Such an IRM would only need to reach the SA-cell(s) in power-saving mode that could possibly be better candidate(s) than the best currently active SA-cell. Another example of transmitting the IRM at less than the maximum terminal's transmitting power could be that the system information provided by a currently active SA-cell or by the serving LA-cell also includes information about the SA-cell density in the area. In such an example, the terminal may limit the transmitting power for the IRM accordingly.

In an embodiment, the terminal 15 may be configured to transmit the IRM more than once, in a sequence, e.g. to overcome the possibility of corruption by noise, to overcome the possibility of interference from a similar message from a different terminal, and/or to overcome the sleep period of an SA-cell in power-save mode and listening for only a fraction of the time. In such an embodiment, the terminal may be configured to transmit subsequent IRMs in the sequence with increased or with increasing power. The terminal may also be further configured to transmit subsequent IRMs with a randomized delay relative to the preceding IRM in the same sequence, in order to avoid subsequent collisions of the IRMs.

In step 42, at least some of the SA-cells may receive the IRM transmitted by the terminal and process the IRM by at least determining the signal strength with which the IRM is received. The SA-cells may further be configured to estimate the path loss from the terminal to the receiving SA-cell. The SA-cell may use the estimated path loss for e.g. estimating whether a requested (minimum) bit rate is at all feasible on the wireless path between the terminal and the SA-cell (and, if not, the SA-cell may decide to refrain from responding).

The SA-cell may be configured to process all of the IRMs that it receives or may choose to ignore some IRMs, such as those requesting a service that the SA-cell is unable to deliver at the moment (e.g. because an unsupported RAT and/or frequency band is requested, and/or because the SA-cell is already highly loaded), and/or those IRMs that have been received with a low signal level and/or with a high estimated path loss. The SA-cell may also be configured to ignore IRMs received from the terminals not related to the network of the SA-cell (e.g. terminals related to a competitor's network) and/or to ignore IRMs received with an access priority indication lower than a predetermined threshold. The SA-cell may be able to identify a terminal as belonging to a different network based on the terminal identification provided in the IRM (for such an embodiment, the identification does not need to be terminal-specific, a network-specific identification is sufficient).

It may be noted that, in various embodiments, a wireless access network may contain multiple different types of SA-cells, e.g. SA-cells supporting different (or multiple) frequency bands, SA-cells supporting different (or multiple) RATs, SA-cells supporting different (or multiple) modes of operation, and/or SA-cells of different sizes (macro-, micro-, pico- and femtocells). Still, each of these SA-cells may be configured to have an SA-cell's monitoring of IRMs which could be performed regardless the SA-cell's specific capabilities for the data transfer (data connection or traffic channel). In fact, the radio interface at the terminal for transmitting the IRM and the radio interface at the SA-cells for receiving the IRMs may be designed specifically for the IRMs and may be independent of the SA-cell's capabilities for data transfer (data connection or traffic channel). However, in case the frequencies used for the communicating the IRMs and for communicating the actual user data over the established data connection would be significantly different, then the signal strength measurement and/or path loss estimate made using the frequency at which the IRM was sent may be not very well representative for the path loss on the frequency to be used for the actual user data transfer (e.g. when the IRM is transmitted in the 900 MHz range while the data connection is established in the 5 GHz range). In such cases, a similar IRM may be defined using a different frequency (e.g. in the 3 GHz range) that allows a more representative signal strength/path loss estimate. The terminal 15 may then be configured to transmit either or both of these IRMs, even simultaneously, if needed.

At least the SA-cells in the power-save mode may be configured to monitor (listen) for the IRMs which may be emitted by the terminals. The SA-cells in the active mode may also be configured to listen for the IRMs, however such listening by the active SA-cells may be not required when the terminal is configured to monitor the signals of the active SA-cells serving one or more other terminals and when the signals received by the terminal enable the terminal to sufficiently assess the suitability of these candidate SA-cells. Then, the terminal may maintain a list of suitable active candidate SA-cells for establishing the data connection.

In an embodiment, the SA-cells in the power-save mode can be configured to enter the listening mode (i.e. be capable of receiving IRMs) only for a fraction of time, in order to limit power consumption. For example, the SA-cell in the power-save mode may enter the listening mode periodically, for e.g. ¹/₁₀th of the time, thus reducing the power consumed for this purpose to roughly the same fraction (compared to the situation with listening for 100% of the time). In such embodiments, the listening periodicity, the duration of the IRMs transmitted by the terminal, and/or the number of repetitions of the IRMs in a sequence could be selected such that at least one IRM can be received within a SA-cell's listening cycle.

In step 43, at least some of the SA-cells that received and measured the IRMs may be configured to wirelessly transmit messages containing their responses to the terminal, e.g. via a channel on the requested RAT and/or frequency, or via a common information request response channel (which could be designed specifically for the purpose). Such messages could include at least a portion of the measured results to the terminal 15 (e.g. the measured signal strength and/or the estimated path loss determined by the SA-cell). The SA-cells may also be configured to include in their messages an indication to what extent the SA-cell is capable and able to provide the requested service. Further, the SA-cells may be configured to include additional information regarding their current load and/or their currently available resources (e.g. RAT, frequency or frequency band, codes) and/or may further propose specific resources, which resources the SA-cell provisionally reserves for the case the terminal would select the SA-cell.

The SA-cell may be configured to only transmit a message regarding some IRMs. For example, the SA-cell may be configured to not transmit a message to the terminal if the SA-cell cannot provide the service requested by the IRM. Alternatively, the SA-cell could be configured to process and transmit response messages even regarding such IRMs, with an indication that the SA-cell is unable to provide the service and, optionally, an indication of what the SA-cell is capable of and able to provide, as described above.

In an embodiment, if the SA-cell is able to support the service requested in the received IRM, the SA-cell may provisionally reserve the resources according to the requested service and also inform the terminal about it. Such provisionally reserved resources may be freed up after a suitable period (e.g. when a timer expires) or when the SA-cell is informed that its service is not needed for this particular service request.

In an embodiment, the responding SA-cell may be configured to apply a small controlled delay between the moment the IRM is received and the moment the corresponding response message is transmitted (and, when applicable, also to control the time between repeated response messages to a sequence of IRMs). By controlling the delay in dependence of e.g. the strength of the signal with which the SA-cell received the IRM from the terminal, a potentially better candidate SA-cell can be made to respond earlier than a potentially worse candidate SA-cell, thus supporting the terminal's function of receiving the response messages and of selecting the best candidate SA-cell.

Because more than a single SA-cell may respond at about the same time to the same IRM from the terminal, it is desirable that there is a mechanism to cope with response messages from multiple SA-cells arriving at the terminal overlapping (simultaneously) or partially overlapping. This may be achieved, for example, by configuring the different (e.g. neighboring) SA-cells to use different channel codes and configuring the terminal 15 to simultaneously monitor multiple different channel codes, possibly all of the different channel codes. This may also be achieved by multiple (repeated) transmissions of a same response message from an SA-cell at separate moments, separated by different (e.g. randomized or SA-cell-dependent) delays.

In an embodiment of step 43, the SA-cells may be configured to wirelessly transmit messages containing their responses to the terminal not directly but via the LA-cell that the terminal is camping on. In such an embodiment, the SA-cells would first transmit their responses to the LA-cell and the LA-cell then would provide to the terminal one or more reports containing at least some of the information received in the responses from the SA-cells. For example, the LA-cell may provide to the terminal and aggregate reports for all of the SA-cells that provided responses regarding received IRMs.

In an embodiment, based on the responses received from the SA-cells, the terminal 15 may be configured to maintain a list of at least the most recent and most relevant results for the measured signals together with the indication of the corresponding SA-cells.

Further, the embodiments of Solution #2 could be combined with the Solution #1 in that the terminal 15 may perform the method steps 41-43 but then, instead of making the selection of the SA-cell itself, provide a report regarding the measurements to the decision unit 11, similar to the step 33 described in the Solution #1. Such a report could include at least some of the information provided to the terminal by the SA-cells that received and processed the IRM transmitted by the terminal. The decision unit 11 could then select one or more SA-cell for establishing the data connection with the terminal based on this report, similar to the step 34 described in the Solution #1. A person skilled in the art would readily recognize how to adapt the discussions of steps 33 and 34 to this embodiment and, therefore, in the interests of brevity, these discussions are not repeated here.

Continuing with the method illustrated in FIG. 6, in step 44, based, at least partially, on the information received in the response messages from one or more SA-cells, the terminal 15 selects (assigns) one or more SA-cell from the candidates for establishing the data connection. The candidates may include not only the SA-cells that provided their response to the terminal, but also the SA-cells that didn't provide their responses and the SA-cells that didn't even receive the IRM. This could be used e.g. when the terminal is configured to monitor active SA-cells and to evaluate whether the monitored active SA-cells constitute suitable candidates for establishing the data connection with. In other words, in addition to the information received in the response messages, the terminal 15 may also take into consideration, when selecting a SA-cell, information regarding other SA-cells that did not provide responses.

The terminal 15 may further be configured for establishing the data connection (i.e., setting up a traffic channel) with the selected one or more SA-cell. Further, a route for the traffic (and the associated signaling) may be set up connecting the selected one or more SA-cell and the network.

Further, the terminal 15 and/or the SA-cells and/or the network may be further configured to inform the non-selected SA-cell(s), which may then release the provisionally reserved resources for fulfilling the request. For example, once a data connection has been established between the terminal and the selected SA-cell, the terminal may provide the SA-cell identities of the non-selected SA-cells to the selected SA-cell and the selected SA-cell may then inform the non-selected SA-cells accordingly.

In a cellular wireless telecommunication system it may happen that a terminal in active mode, having a connection with a particular cell, moves out of (the coverage area of)

that cell and into (the coverage area of) another cell. Then a so-called handover (handoff) may be performed, meaning that the connection between the terminal and the current cell (source cell) is transferred (handed over) to a connection between the terminal and a different cell (target cell).

Solution #2 as described above may also be used in an energy-efficient wireless network to facilitate a handover of the data connection between an active terminal and the SA-cell it has established the data connection with to another, different, SA-cell.

An active terminal may emit an IRM as described above, e.g. periodically and/or when the signal received from the SA-cell it has established a data connection with drops below a predetermined threshold and/or when triggered by the network. The terminal may evaluate the information contained in the response messages received from the SA-cells and, taking into account considerations similar to the ones described above, select a different SA-cell as target SA-cell for a handover.

As described above, the terminal may further inform the network and/or LA-cell and/or the involved (source and target) SA-cells.

Solution #3: Session Setup Via Sa-Cells Measuring Signal Transmitted by the Terminal in Idle Mode and the Network Selecting the Sa-Cell Based on the Measurements Similar to the solutions #1 and #2 described above, in the context as illustrated in FIGS. 3 and 4, the terminal 15 is assumed to be an idle terminal which may, in the future, have to transfer to an active mode, either because it receives a page (e.g. from the LA-cell the terminal camps on, e.g. the LA-cell 12) or because the terminal 15 (possibly via the user of the terminal) initiates exchange of user data. Similar to the solutions #1 and #2, embodiments of the solution #3 also address the problem of selecting (assigning) a suitable SA-cell (one already active or one currently in power-save mode) for that terminal.

Similar to the solution #2, embodiments of solution #3 are based on the idea that a terminal in the idle mode is configured to emit the IRM intended to be received by one or more of the SA-cells in the telecommunications network and that at least some of the SA-cells may be able to receive the IRM transmitted by the terminal and determine the signal strength with which they received the IRM. At least some of those SA-cells that determined the signal strength of the received IRM can then provide messages to the decision unit reporting the determined signal strength. At least partially based on such messages received from the SA-cells, the decision unit can then make a selection of one or more of the most appropriate SA-cells for the terminal to establish the data connection with.

In this manner, the terminal 15 facilitates establishment of the data connection between the terminal 15 and one of the SA-cells by enabling the SA-cells to obtain information indicative of the propagation conditions between the terminal 15 and various SA-cells (e.g., signal strength). Since the SA-cells then report the results of their measurements to the decision unit (which could possibly be included within the LA-cell), the selection of at least one SA-cell for the terminal may be centrally managed.

Figure 7:
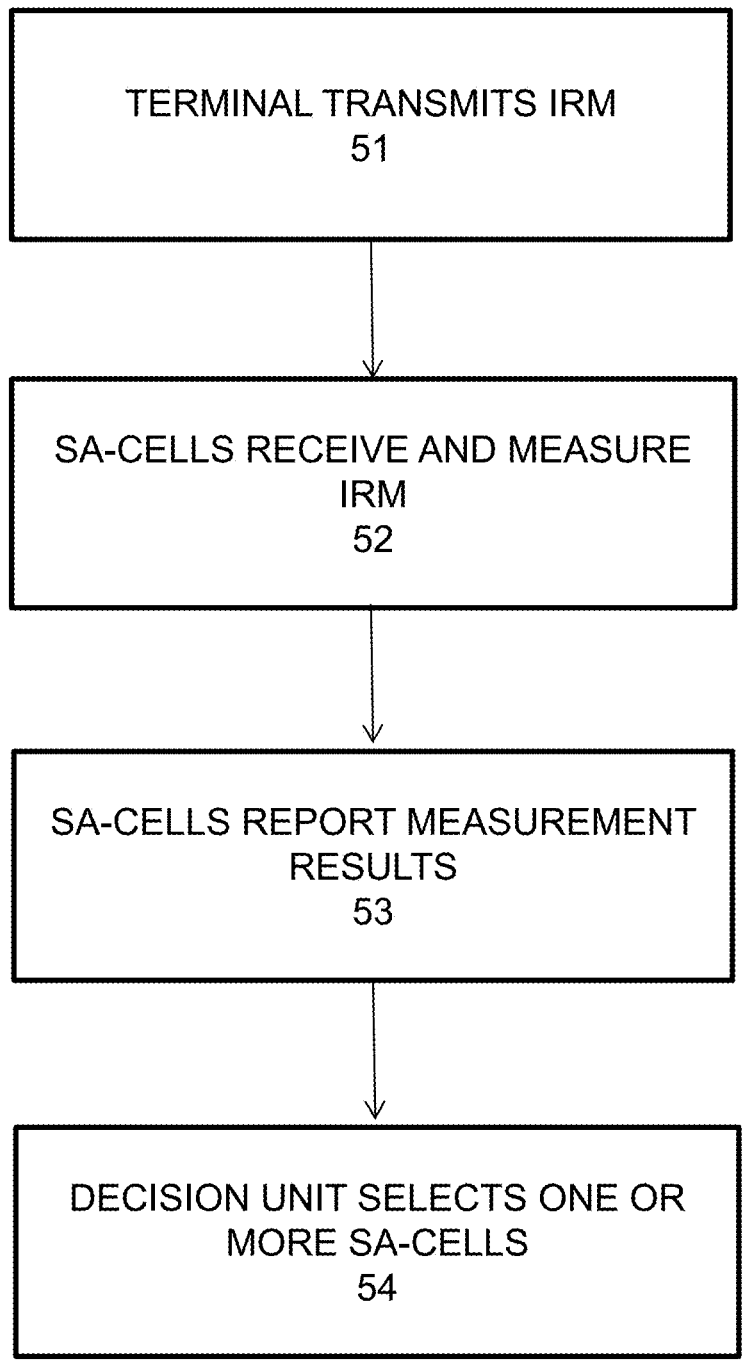
FIG. 7 sets forth a flow diagram of method steps for selecting one or more SA-cells when the terminal transmits an information request message, according to another embodiment of the present invention.

FIG. 7 sets forth a flow diagram of method steps for selecting one or more of the SA-cells 13, 14 when the terminal 15 transmits an IRM and the decision unit 11 makes the selection of the most appropriate SA-cell, according to one embodiment of the present invention. While the method steps are described in conjunction with FIG. 3, persons skilled in the art will recognize that any system configured to perform the method steps, in any order, is within the scope of the present invention.

The method begins in step 51 where the terminal 15 in an idle mode transmits an IRM. In one embodiment, the terminal 15 may be configured to transmit the IRM at some predetermined times and/or at some predetermined pattern, even though there is no immediate need to establish a data connection with any of the SA-cells. In other embodiments, the terminal 15 may be configured to transmit the IRM when the terminal receives an indication that the data connection between the terminal and one of the SA-cells should be established. Such an indication could e.g. be a paging message received from the LA-cell 12 on which the idle terminal 15 is camping or be an indication from the user of (or an application running on) the terminal wishing to exchange user data over the established data connection.

In one embodiment, the IRM may be transmitted via a broadcast channel. The IRM is not intended for and not directed towards the LA-cell (as opposed to e.g. a service request message typically used in conventional networks) but is intended for SA-cells which may potentially provide service to the terminal 15. To that end, the IRM could also include information indicative of the request of the terminal for establishing a data connection between the terminal and one of the SA-cells.

In an embodiment, the terminal may be configured to include in the IRM an identification of the network to which the terminal belongs. By providing such identification in the IRM, the SA-cell receiving the IRM can differentiate between the IRMs received from terminals belonging to different networks and then choose whether or not to respond. For example, the SA-cell may choose not to respond when the IRM is sent by a terminal in a competitor's network. In this case, the provided identification does not need to be terminal-specific. It would be sufficient to only identify the network that the terminal belong to.

The IRM may also include an indication of access priority. For example, an emergency response terminal or a consumer terminal making an emergency call may include an indication of high access priority or an M2M terminal (e.g. electricity meter) may include an indication of low access priority. By providing such an indication in the IRM, the SA-cell receiving the IRM can differentiate between the IRMs received from terminals and/or purposes having different access priorities and then choose whether or not to respond.

Further, the IRM should be such as to allow the receiving SA-cell to determine the signal strength with which the IRM is received and/or to estimate the path loss between the terminal and the receiving SA-cell.

Optionally, the IRM may include an indication of the service(s) requested and/or the terminal capabilities, which may be relevant to a SA-cell receiving the IRM in determining to what extent the SA-cell is capable and able to provide the requested service. The terminal capabilities that could be indicated in the IRM include e.g. one or more of supported frequency band(s), supported RAT(s), supported mode(s), power with which the IRM is sent by the terminal, supported (maximum) terminal power, and requested (minimum) bit rate.

In various embodiments, similar to the solution #2, the terminal 15 may transmit the IRM with a relatively high power (e.g. at the maximum terminal's transmitting power or at still relatively high power, but lower than the maximum power) in order to maximize the likelihood that at least one suitable SA-cell is able to detect the IRM.

Also similar to the solution #2, the terminal 15 may be configured to transmit the IRM more than once in a sequence, where the subsequent IRMs in the sequence may be transmitted with increased or with increasing power and/or with a randomized delay relative to the preceding IRM in the same sequence.

In step 52, at least some of the SA-cells may receive the IRM transmitted by the terminal and process the IRM by at least determining the signal strength with which the IRM is received. All of the discussions provided above regarding step 42 of solution #2 (i.e., the description after the introduction of step 42 and before the introduction of step 43) are applicable to step 52 shown in FIG. 7 and, in the interests of brevity, are not repeated here.

In step 53, at least some of the SA-cells that received and measured the IRMs may be configured to transmit messages containing their responses to the decision unit, e.g. via backhaul links typically found between each of the SA-cells and the network and between the LA-cell and the network and/or via other links providing a same interconnection between SA-cells and the LA-cell, if the decision unit 11 is a part of the LA-cell 12. Such messages could include information regarding at least a portion of the measured results (e.g. the measured signal strength and/or the estimated path loss determined by the SA-cell). In addition, the SA-cells may supplement the message with additional information such as the identity of the SA-cells and/or with an indication of the time when the IRM was received by the SA-cell. The SA-cells may also be configured to include in their messages an indication to what extent the SA-cell is capable and able to provide the requested service. Further, the SA-cells may be configured to include additional information regarding their current load and/or their currently available resources (e.g. RAT, frequency or frequency band, codes) and/or may further propose specific resources, which resources the SA-cell provisionally reserves for the case the terminal would select the SA-cell.

If the IRM included information allowing an identification of the terminal provided in any of the manners described in association with solution #2, then the SA-cell may be configured to detect that information and to forward it to the decision unit 11. If the decision unit 11 receives (potentially a lot of) messages from the SA-cells that relate to requests from different terminals, receiving such information that allows the decision unit to identify the IRM and/or the terminal that transmitted the IRM may be particularly useful. For example, the decision unit 11 may be able to identify the IRM and/or the transmitting terminal by receiving, from the SA-cell, information related to the time of reception of the IRM, to the channel on which or the channel code with which it was received, and/or to the contents of the IRM, which may include, e.g. a (partial) terminal identification and/or some kind of reference (tag or label) inserted in the IRM by the terminal. This would allow the decision unit to relate all received messages (received with a certain time frame) with a particular combination of partial ID and/or a reference (tag, label) to each other.

Similar to the solution #2, the SA-cell may be configured to transmit messages to the decision unit only regarding some IRMs. For example, the SA-cell may be configured to not transmit a message to the decision unit if the SA-cell cannot provide the service requested by the terminal. Alternatively, the SA-cell could be configured to process and forward messages even regarding such IRMs, with an indication that the SA-cell is unable to provide the service and, optionally, an indication of what the SA-cell is capable of and able to provide, as described above.

In an embodiment, if the SA-cell is able to support the service requested in the received IRM, the SA-cell may provisionally reserve the resources according to the requested service and also inform the decision unit about it and may, optionally, also inform the terminal. Such provisionally re-served resources may be freed up after a suitable period (e.g. when a timer expires) or when the SA-cell is informed that its service is not needed for this particular service request.

In step 54, based, at least partially, on the information received in the messages from one or more SA-cells, the decision unit 11 is configured to select (assign) one or more SA-cell from the candidates for the terminal to establish the data connection with. The candidates may include not only the SA-cells that provided their response to the decision unit, but also the SA-cells that didn't provide their responses and the SA-cells that didn't even receive the IRM. This could be used e.g. when the decision unit is configured to obtain information regarding active SA-cells via e.g. steps 31-33 illustrated in FIG. 5 and described above. When decision unit 11 has such information, it is able to evaluate whether the monitored active SA-cells constitute suitable candidates for the terminal to establish the data connection with. In other words, in addition to the information received in the messages from the SA-cells, the decision unit 11 may also take into consideration, when selecting a SA-cell, information regarding other SA-cells that did not provide responses.

Once one or more SA-cells are selected by the decision unit 11 as the most appropriate SA-cells for establishing the data connection with the terminal, the decision unit 11 may indicate the selected SA-cells to the terminal. In one embodiment, such indication may be provided via the LA-cell (e.g. in response to receiving a SRM received from the terminal via the LA-cell). This could be particularly useful when the IRM transmitted by the terminal and forwarded by the SA-cells to the decision unit 11 contains a terminal identity suitable to uniquely address the terminal in the LA-cell or when the IRM contains the partial terminal ID and/or reference (tag or label) the terminal used in the IRM, such that the LA-cell/decision unit is able to reconcile the IRM (and therewith possibly the full terminal ID) with the result of the selection. In another embodiment, such indication may be provided via one or more of the selected SA-cells. The latter embodiment assumes that a channel (with mutually known resource details) between the terminal and the selected SA-cell can be made available, along which channel an SA-cell may initiate the set up of a data connection to the terminal. Also in this embodiment the terminal ID or the partial terminal ID and/or the reference (tag or label) may facilitate the terminal to receive and recognize the indication for the terminal.

The terminal 15, in response to receiving the indication regarding the selected SA-cell, may further be configured for establishing the data connection (i.e., setting up a traffic channel) with the selected one or more SA-cell. Further, a route for the traffic (and the associated signaling) may be set up connecting the selected one or more SA-cell and the network.

Once the decision unit 11 knows the identities of the selected SA-cells, the decision unit 11 may assist in and prepare for setting up the route for the traffic connecting the selected SA-cell and the network. This may also be performed by LA-cell 12 when decision unit 11 is within the LA-cell or when the decision unit provides the information to the LA-cell.

Further, the decision unit 11 may be further configured to inform the non-selected SA-cell(s), which may then release the provisionally reserved resources for fulfilling the request.

If any of the selected SA-cells are in a power-save mode, the decision unit 11 may further be configured to activate the selected SA-cells (possibly via the LA-cell).

In a cellular wireless telecommunication system it may happen that a terminal in active mode, having a connection with a particular cell, moves out of (the coverage area of) that cell and into (the coverage area of) another cell. Then a so-called handover (handoff) may be performed, meaning that the connection between the terminal and the current cell (source cell) is transferred (handed over) to a connection between the terminal and a different cell (target cell).

Solution #3 as described above may also be used in an energy-efficient wireless network to facilitate a handover of the data connection between an active terminal and the SA-cell it has established the data connection with to another, different, SA-cell.

An active terminal may emit an IRM as described above, e.g. periodically and/or when the signal received from the SA-cell it has established a data connection with drops below a predetermined threshold and/or when triggered by the network. The SA-cells receiving the IRM may forward their messages to the decision unit.

The decision unit may evaluate the information contained in the messages received from the SA-cells and, taking into account considerations similar to the ones described above, select a different SA-cell as target SA-cell for a handover.

As described above, the decision unit may further inform the terminal and/or the LA-cell and/or the involved (source and target) SA-cells.

One embodiment of the invention may be implemented as a program product for use with a computer system. The pro-gram(s) of the program product define functions of the embodiments (including the methods described herein) and can be contained on a variety of, preferably non-transitory, computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory, flash memory) on which alterable information is stored. The computer program may be run on the processors described herein.

What is claimed is:

1. In a telecommunications system comprising a decision unit, an LA-cell base station, and a plurality of SA-cell base stations, a method for a terminal to facilitate establishment of a data connection between the terminal and at least one of the plurality of the SA-cell base stations, while at least one of the plurality of the SA-cell base stations is in power saving mode, the LA-cell base station optimized to exchange signaling messages with the terminal and the SA-cell base stations each optimized to exchange user data with the terminal, the method comprising:

while the terminal is in an idle mode and is camping on the LA-cell base station, the terminal determining properties of a signal received from each of one or more SA-cell base stations of the plurality of SA-cell base stations, the properties being indicative of propagation conditions between each of the one or more SA-cell base stations and the terminal;

while the terminal is in the idle mode and is camping on the LA-cell base station, the terminal providing a report to the decision unit, via the LA-cell base station, the report comprising at least information indicative of at least a portion of the determined properties for at least one of the one or more SA-cell base stations;

while the terminal is in an idle mode and is camping on the LA-cell base station, the terminal receiving an indication that the data connection is to be established between the terminal and a selected SA-cell base station of the plurality of SA-cell base stations, wherein the selected SA-cell base station is selected by the decision unit at least partially based on the report.

2. The method according to claim 1, wherein, for each of the one or more SA-cells, the determined properties comprise a signal strength of the signal received from the each of the one or more SA-cells and/or a path loss estimate.

3. The method according to claim 1, wherein when at least two SA-cell base stations of the one or more SA-cell base stations are in a power-save mode, each of the at least two SA-cell base stations transmits the signal to the terminal in a predetermined pattern.

4. The method according to claim 3, wherein the predetermined pattern for the each of the at least two SA-cell base stations is such that the terminal receives the signals from each of the at least two SA-cell base stations substantially contemporaneously.

5. The method according to claim 3, wherein the predetermined pattern for the each of the at least two SA-cell base stations is such that the terminal receives the signals from each of the at least two SA-cell base stations in a succession.

6. The method according to claim 1, wherein the terminal is in a power-save mode and the method further comprises the terminal exiting the power-save mode to receive the signal from the each of the one or more SA-cell base stations and/or to determine the properties of the signal received from the each of the one or more SA-cell base stations.

7. A terminal comprising means for performing the steps of claim 1.

8. A non-transitory computer readable medium having stored thereon a computer program comprising software code portion configured, when executed by a processor, for performing the steps of claim 1.

9. A decision unit comprising a processor, the processor configured at least for:

receiving from a terminal in idle mode camping on a LA-cell base station a report comprising at least information indicative of at least a portion of properties determined for at least one of a plurality of SA-cell base stations, the terminal determining properties of a signal received from each of one or more SA-cell base stations of the plurality of SA-cell base stations, the properties being indicative of propagation conditions between each of the one or more SA-cell base stations and the terminal, the LA-cell base station optimized to exchange signaling messages with the terminal and the SA-cell base stations each optimized to exchange user data with the terminal, and based at least partially on the report, selecting at least one SA-cell base station of the plurality of SA-cell base stations for establishing the data connection between the terminal and the selected SA-cell base station.

10. The decision unit according to claim 9, wherein the processor is further configured for providing an indication to the terminal that the data connection is to be established between the terminal and the selected SA-cell base station.

11. The decision unit according to claim 10, wherein the indication is provided in response to receiving a service request message from the terminal, via the LA-cell base station, requesting establishment of the data connection.

12. The decision unit according to claim 9, wherein the processor is further configured for, when at least one SA-cell base station of the one or more SA-cell base stations is in a power-save mode and in response to receiving a service request message from the terminal, providing a transmit-trigger to the at least one SA-cell base station to transmit the signal.

13. The decision unit according to claim 12, wherein the transmit-trigger is at least partially based on one or more of a terminal location estimate, an estimate of the accuracy of the terminal location estimate, and activity status of the SA-cell base stations in the vicinity of the estimated terminal location.

14. An LA-cell base station comprising the decision unit according to claim 9.

* * * * *

UNITED STATES PATENT AND TRADEMARK OFFICE
CERTIFICATE OF CORRECTION

PATENT NO. : 9,936,445 B2  
APPLICATION NO. : 14/971978  
DATED : April 3, 2018  
INVENTOR(S) : Ljupco Jorguseski et al.

Page 1 of 1

It is certified that error appears in the above-identified patent and that said Letters Patent is hereby corrected as shown below:

On the Title Page

Under item (71), Applicant NEDERLANDSE ORGANISATIE VOOR TOEGEPAST-NATUURWETENSCHAPPELIJK ONDERZOEK TNO, please delete "The Hague (NL)" and insert --'S-Gravenhage (NL)--

Signed and Sealed this  
Fifth Day of June, 2018

Andrei Iancu  
*Director of the United States Patent and Trademark Office*